(12) United States Patent
McIntyre et al.

(10) Patent No.: US 11,887,752 B2
(45) Date of Patent: Jan. 30, 2024

(54) BLOCKS-IN-CONDUIT CABLE USING HIGH-TEMPERATURE SUPERCONDUCTING TAPE

(71) Applicants: The Texas A&M University System, College Station, TX (US); Accelerator Technology Corp., College Station, TX (US)

(72) Inventors: Peter McIntyre, Bryan, TX (US); John Scott Rogers, College Station, TX (US)

(73) Assignees: The Texas A&M University System, College Sation, TX (US); Accelerator Technology Corp., College Station, TX (US)

(*) Notice: Subject to any disclaimer, the term of this patent is extended or adjusted under 35 U.S.C. 154(b) by 45 days.

(21) Appl. No.: 17/511,278

(22) Filed: Oct. 26, 2021

(65) Prior Publication Data

US 2022/0238256 A1    Jul. 28, 2022

Related U.S. Application Data

(60) Provisional application No. 63/198,543, filed on Oct. 26, 2020.

(51) Int. Cl.
*H01B 12/06* (2006.01)
*H01B 1/08* (2006.01)
*H01B 7/18* (2006.01)

(52) U.S. Cl.
CPC .............. *H01B 12/06* (2013.01); *H01B 1/08* (2013.01); *H01B 7/18* (2013.01)

(58) Field of Classification Search
CPC .......... H01R 4/68; H01B 12/02; H01B 12/06; H01B 1/08; H01B 7/18
USPC ...................................................... 174/125.1
See application file for complete search history.

(56) References Cited

U.S. PATENT DOCUMENTS

| | | | | |
|---|---|---|---|---|
| 5,932,523 | A * | 8/1999 | Fujikami | H10N 60/0801 |
| | | | | 505/231 |
| 6,448,501 | B1 * | 9/2002 | McIntyre | H01B 12/16 |
| | | | | 174/15.5 |
| 8,437,819 | B2 * | 5/2013 | Takayasu | H01B 12/02 |
| | | | | 505/231 |
| 11,289,640 | B2 * | 3/2022 | Solovyov | H01B 12/06 |
| 11,398,329 | B2 * | 7/2022 | Bateman | A61N 5/1077 |
| 11,581,115 | B2 * | 2/2023 | Hahn | H01B 12/02 |
| 2016/0344113 | A1 * | 11/2016 | Fersan | H01R 13/22 |
| 2019/0027278 | A1 * | 1/2019 | Sekiya | H01B 12/06 |
| 2019/0267172 | A1 * | 8/2019 | Lu | H01F 41/063 |
| 2020/0028061 | A1 * | 1/2020 | Nakai | H01R 4/68 |
| 2020/0194657 | A1 * | 6/2020 | Solovyov | H10N 60/0128 |
| 2020/0365304 | A1 * | 11/2020 | Slade | G21B 1/057 |
| 2021/0350957 | A1 * | 11/2021 | Takayasu | H01B 12/06 |
| 2021/0375507 | A1 * | 12/2021 | Estrada | H01B 12/02 |
| 2021/0376498 | A1 * | 12/2021 | Craighill | H01B 12/02 |
| 2021/0407716 | A1 * | 12/2021 | Radovinsky | H01F 6/06 |

(Continued)

*Primary Examiner* — Timothy J Thompson
*Assistant Examiner* — Michael F McAllister
(74) *Attorney, Agent, or Firm* — Winstead PC

(57) ABSTRACT

A design is presented for a structured cable suitable for carrying a large electric current in a cable-in-conduit comprising an assembly of rectangular stacks of thin superconducting tapes, with provisions for mechanical support of large mechanical stress and cross-flow of cooling fluid capable of removing large amounts of heat.

19 Claims, 18 Drawing Sheets

(56) References Cited

U.S. PATENT DOCUMENTS

2022/0013256 A1* 1/2022 Hubbard ................ H01B 12/02
2022/0172863 A1* 6/2022 Slade ..................... H01B 12/06

* cited by examiner

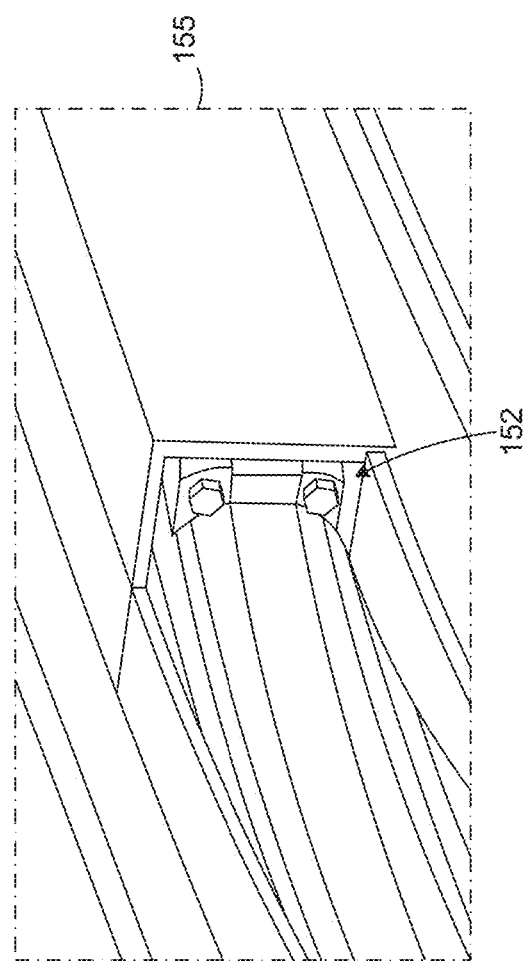
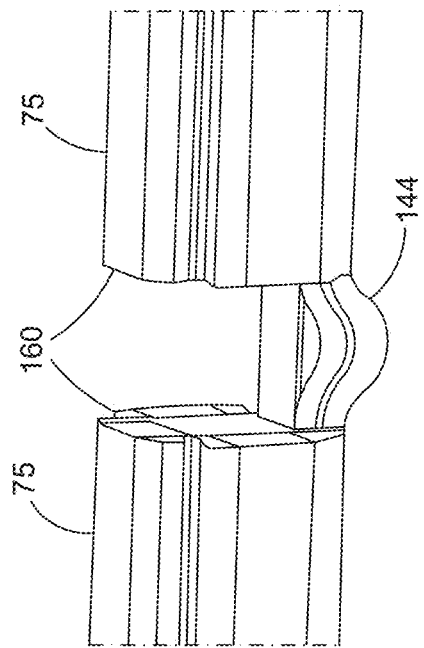
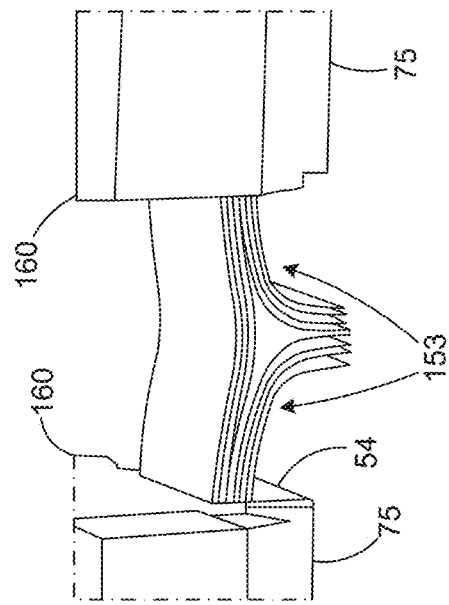

BLOCKS-IN-CONDUIT CABLE USING HIGH-TEMPERATURE SUPERCONDUCTING TAPE

CROSS-REFERENCE TO RELATED APPLICATIONS

This patent application claims priority from, and incorporates by reference the entire disclosure of, U.S. Provisional Application 63/198,543 filed on Oct. 26, 2020.

TECHNICAL FIELD

The present disclosure relates to the field of superconducting cables, and more particularly to a cable comprising a multiplicity of symmetrically disposed blocks.

BACKGROUND OF THE INVENTION

This section provides background information to facilitate a better understanding of the various aspects of the disclosure. It should be understood that the statements in this section of this document are to be read in this light, and not as admissions of prior art.

There are applications that require use of superconducting cables in the windings of high-field electromagnets, for example for particle accelerators or magnetic-confinement nuclear fusion. There are applications that require superconducting cables for the windings for electric generators, for example wind turbines. There are applications that require superconducting cables for the windings for electric motors, for example for propulsion of ships, aircraft, or land vehicles. There are applications that require superconducting cables for storing energy in a magnetic field, for example superconducting magnetic energy storage (SMES). There are applications that require superconducting cables for electric power transmission, for example in a direct-current (d.c.) or alternating-current (a.c.) transmission line.

For some applications it may be desirable to use tapes of high-temperature superconductors (yttrium-barium-copper oxide, YBCO, or rare-earth-barium copper oxide REBCO, or bismuthstrontium-calcium-copper oxide Bi-2223, collectively called 'HTS') which can operate at temperatures T=10 K–80 K with significant current density even in strong magnetic field. For many of the applications, the performance and energy efficiency of the process improves for operation at temperature in the range 10-40 K. For such applications, low-temperature superconductors NbTi, $Nb_3Sn$, and Bi-2212 could not provide sufficient performance at temperatures T=10 K–80 K and so the HTS materials are uniquely required.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In aspects of the disclosure, a cable and a support structure that can be co-wound with the cable are disclosed. The support structure helps to control and manage mechanical stress and provide cross-flow cooling within a multi-turn winding of the cable. The support structure can carry large electrical current in an electrically insulated winding for operation at low temperature, large mechanical stress, and high magnetic field. The present disclosure also relates to a winding in which the cable is wound in layers, and blocks within the cables of each layer have a distinct multiplicity of superconducting tapes, and the superconducting cables of successive layers are spliced end-to-end so that electrical current is conveyed in series through all layers.

An aspect of the disclosure is directed to a structured cable suitable for carrying a large electric current in a multiplicity of sub-cables, each sub-cable comprising a rectangular stack of thin HTS tapes, with provisions for mechanical support of large mechanical stress and cross-flow of cooling fluid capable of removing large amounts of heat.

A further aspect of the disclosure is directed to a co-wound armor, assembled with the structured cable as it is wound to form a winding, suitable for providing stress management at the cable level and throughout the winding to preserve the full performance of the HTS tapes within all turns of the cable.

A further aspect of the disclosure is directed to provision of cross-flow cooling in which a coolant fluid is conveyed through channels within the co-wound armor and passes through transverse channels in the structured cable so that it provides uniform volumetric cooling throughout a thick winding.

A further aspect of the disclosure is directed to a graded winding configuration comprising a series connection of structured cables of graded composition, connected using interleaved splice joints, electrically insulated between layers by a radiation-hard composite insulation layer, and supported within a structural frame.

A blocks-in-conduit (BIC) cable includes four conductor blocks of superconductor, in which each conductor block is supported in a rectangular channel within a laminated core. The assembly of conductor blocks and laminated core are conveyed within a perforated metal sheath tube.

In some aspects, each conductor block includes a plurality of thin, parallel superconducting tapes of equal width, stacked face-to-face.

In some aspects a perforated metal center tube is provided along the axis of the laminated core, and a distribution of alignment slots is provided along the length of the laminated core. A radial flow aperture is provided in a plurality of flow control laminations that are inserted in the stack of core laminations along the laminated core to provide for a controlled radial flow (cross-flow) of a coolant fluid from the center channel to the rectangular flow channels along an outside of armor half-shells within a winding.

A method for fabrication and assembly for a laminated core of BIC cable includes cutting core laminations from thin copper sheet, using either die-stamping or electric-discharge machining (EDM), with interior features including four rectangular channels and four alignment slots at symmetric locations cut into an outer edge of the core laminations. A center hole is also cut to accommodate a perforated center tube. Crossflow laminations are cut from the same thin copper sheet with the same features as the core laminations with an additional single flow control channel connecting from the center hole to one of the alignment slots. An interleaved stack of core laminations and flow control laminations are assembled and aligned on a frame that aligns them precisely against reference edges, and a plurality of round alignment rods are inserted into alignments slots.

A method for preparing a conductor block includes stacking a plurality of HTS tapes of equal width in fixtured to be parallel with face-to-face contact. Thin foil strips of flux-coated low-melt solder are positioned so that each side edge of the stack of tapes abuts the face of a fluxed solder foil strip. A laminar spring is positioned on an outer face of the tape stack. The conductor block is compressed, first to apply compression in the direction of the faces of the HTS tapes to compress the stack of tapes and laminar spring, and then in the sideways direction to compress the solder strips so that they plastically deform and loosely bond into the side edges tapes in the tape stack. The assembled conductor block is then in a stable, convenient geometry for insertion into the rectangular channel of the laminated core.

In other aspects, the surfaces of the lamination stack may be fluxed and tinned with low-melt solder, then coated with a film of reducing flux. In other aspects, a laminar spring may be located on the outer face of each conductor block as it is installed in the rectangular channel. The dimensions of the rectangular channel, the conductor block, and the laminar spring are chosen so that, when the perforated sheath tube is drawn by wire-drawing onto the cylindrical outer diameter of the laminated core, the spring is compressed to elastically compress the conductor block so that all HTS tapes are in face-to-face contact. In other aspects, an overwrap of thin metal tape may be applied as an open spiral overwrap under tension to maintain compression of all conductor blocks in their rectangular channels.

A method for assembly of a structured cable core includes inserting four conductor blocks into rectangular channels in a laminated core. The assembly is radially compressed by tightening an array of removable circumferential bands, for example nylon tiewraps, to preserve the integrity and registration of the assembly. In one aspect, a flow control lamination is interspersed in the stack of core laminations, with a spacing $\ell$, that comprise the laminated core. Each flow control lamination contains a radial flow aperture so that coolant fluid can flow from the perforated center tube to the perforated sheath tube with axially distributed cross-flow of coolant fluid can be sustained throughout the extended length of structured cable that comprises one turn of a winding.

A method for twisting a structured cable core so that each conductor block follows a helical contour around the common axis of the structured cable is disclosed. The tape-overwrapped structured cable core is supported on a rotary support, for example a lathe or an arrangement of rotary head, pillow blocks, and tails-stock on a common bed rail, and a center tube is placed under tension between the rotary head and the tail stock so that a laminar core is held straight. The rotary head is rotated with respect to the tail stock so that the structured cable core is twisted with the desired twist pitch L. The removable bands are then removed and a metal tape overwrap is applied under tension with the opposite direction of twist to that applied to the laminar core. The metal tape overwrap is affixed at its ends to the laminar core to sustain the twist pitch against spring-back. The twist pitch L of the superconducting stacks within the structured cable is chosen so that the catenary length of all elements in a tape stack is equal for a bend of angle $\pi/2$ radians with a desired bending radius R: $L=\pi R/2$. Thus, the bending of the structured cable as it is co-wound preserves the registration within the tape stacks inside.

A method for completing an assembly of a BIC cable includes inserting a twisted cable core into a perforated sheath tube. The sheath tube is drawn down to compress it against the outer surface of the twisted cable core so that it compresses the laminar springs locks the internal registration of all elements of the structured cable.

A structured cable includes an assembly of armor half-shells to form each layer of a layer-wound winding to provide stress management within a magnet winding and provide the ability to co-wind the bending radius R required for the winding while preserving the registration and mechanical properties of the structured cable inside. The armor half-shells are fabricated from a high-strength alloy. Each armor half-shell has a rectangular outer contour, an open half-cylindrical channel that is either machined or extruded into the center of one long face, and rectangular step channels machined or extruded along each corner opposite the face with the half-cylindrical channel. The diameter of the half-cylindrical channel is made equal to the diameter of the structured cable, plus a radial allowance to accommodate a wrap of shear-release mica paper separating the structured cable from the co-wound armor for the purpose of releasing shear stress.

A winding containing multiple layers of co-wound armored cable is configured so that all layers are connected in series, and the structured cable in all layers operates with the same fraction of the superconducting current capacity of the constituent HTS tapes. The contours of the desired winding structure are bonded as each layer is formed and a composite insulation layer is applied conformally between layers. Homogeneous cross-flow cooling is maintained in all turns. In some aspects, a spool of BIC cable is mounted so that the cable can be wound onto a winding mandrel of a contour for a particular application, with spools of inward- and outward-facing armor half-shells similarly mounted. The BIC cable is wound under tension onto a winding mandrel of the shape required for the application. A layer of mica paper is applied as a spiral wrap onto the BIC cable as it is payed out during the co-winding. At the location where the three cable components (inner armor half-shell, BIC cable, and outer armor half-shell) arrive at the surface of the mandrel, a hydraulic roller assembly applies a large compressive force to close the gaps between the contiguous rims of the armor half-shells and a sequence of welds is applied at equally spaced intervals to weld the two continuous rims together while the newly co-wound segment has the curvature with which it is tangent to the mandrel. The succession of welds locks in the curvature that is formed in the winding so that spring-back is prevented. As each layer is completed, a sheet of composite insulation layer is applied to electrically isolate one layer from the next to prevent the possibility of Paschen breakdown, for example in helium gas, during rapid ramping or a quench of the winding in operation. The composite insulation layer consists or a sandwich of layers of mica paper and inorganic fabric (either fiberglass or fiber-ceramic), loaded wet with an inorganic frit slurry matrix.

In another aspect, succeeding layers in the winding will operate in successively lower ambient magnet field strength, so that successively fewer HTS tapes are required in each conductor blocks of the BIC cables to carry the series-connected current, but the Lorentz stress that acts on the layers within must be bypassed through the armor beams of those outer layers so that accumulating stress is not loaded onto the structured cables in the outer layers. The number $N_n$ of HTS tapes in each conductor block of the nth layer of a winding is sized for the criterion $$N = \frac{I_{cable}}{4I_c(B_n)}.$$

The bridge thickness $b_n$ in each layer of the co-wound armor half-shells is sized to limit the concentration of transverse stress as Lorentz stress is bypassed around the structured cable, so that the maximum transverse stress is less than the yield strength $E_0$ of the high-strength alloy of the armor:

$$I_{cable} B_n \frac{\Delta R}{w_n} < E_0.$$

The web thickness w of the armor half-shells for each layer is sized to limit the transverse stress that concentrates as it is bypassed around the structured cable:

$$\frac{B_0^2 - B_n^2}{2\mu_0} \frac{\Delta R}{w_n} < E_0.$$

A method of splicing HTC tapes so that the splice can operate at high current but not limit the operation of a winding is disclosed. The splice is formed in a region of the winding that is accessible in the completed winding. Lead ends from two cable segments (Cable 1, Cable 2) are conveyed in a channel that runs beside the overall winding package, parallel to the cables within the winding. Tape stacks in Cable 1 have a twist pitch L, so at separations of L/N succeeding tape stacks are oriented facing in the orientation in which it is most accessible to operate on. An end of the tape stack from Cable 2 is trimmed so that it overlaps the end of Cable 1 by a length S in which the tapes will be interdigitated. A sheath tube of the end segment of both cables is cut and removed for the length S, and the tapes of that tape stack from Cable 1 are interleaved (like shuffling a deck of cards) with those of the corresponding tape stack from Cable 2, and a thin tape of low-melt solder with a flux coating is inserted in each tape-tape interface. The interleaved splice stack is formed in a U-channel of sufficient depth to contain the splice stack. A cover cap is compressed onto the U-channel and fastened with high-strength clamps. The next tape stack from Cable 1 is cut to a longer length (L/N longer than the first tape stack) so that it is in the accessible orientation for splicing. The above procedure is repeated, and so on, until all tape stacks have been spliced. The overall splice is then housed in a superstructure that bonds to the co-wound armor of both cables to support radial and hoop stress in the region of the splice joint. The entire winding is housed in a housing that includes pockets for all splices and provisions to provide manifolded fluid flow to the locations for supply of coolant to the center tubes of the structured cables and return of coolant from the outer channels in the armor for all turns in a parallel flow manifold.

A method for providing low-resistance current-sharing among tape stacks within a BIC cable that results in mechanical bonding and low-resistance current transfer in the splice joints and fusion of a frit-slurry matrix in a composite insulation layer is disclosed. Upon completing a winding, an electric current is driven at ambient temperature through the series-connected structured cable (flowing primarily in the metal cores). The current is controlled to heat the cable homogeneously to a temperature needed to melt and flow low-melt solder foils that are positioned in a space between the edges of the tape stacks and the rectangular channel, to melt and fuse the low-melt frit slurry in the composite insulation layers within the winding, and to melt and flow the low-melt solder foils in the interleaved tape stacks of each splice joint. Both the solder and the frit slurry are available in compositions with melt/flow at ~200° C. The winding is then complete and ready for use in the magnet applications.

BRIEF DESCRIPTION OF THE DRAWINGS

A more complete understanding of the subject matter of the present disclosure may be obtained by reference to the following Detailed Description when taken in conjunction with the accompanying Drawings wherein:

FIG. 14A illustrates a cutaway portion of co-wound armor;

FIG. 14B illustrates a partially completed interleaved splice;

FIG. 14C illustrates a completed interleaved splice;

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Figure 1:
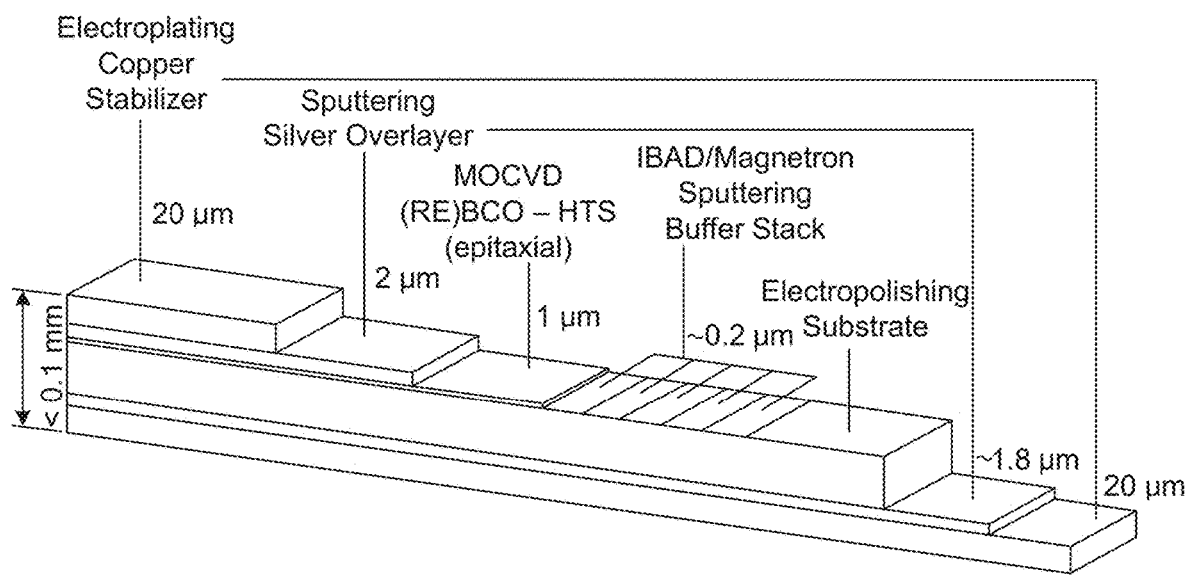
FIG. 1 is a cross-section of REBCO tape with Hastealloy® core and copper cladding.

Three properties of the HTS conductors are important for using them in magnet windings. First, HTS conductors can only be fabricated in thin tapes in which the superconducting layer is typically a few μm thick and the overall tape is ~1 cm wide. Referring to FIG. 1, the tape is typically fabricated by applying a succession of epitaxial layers onto a metal substrate tape, typically made of Hastelloy®. The succeeding epitaxial layers include several buffer layers and a layer of HTS. A layer of silver is then sputter-deposited onto all surfaces of the tape. A layer of copper is then electro-plated onto all surfaces to hermetically seals the superconducting tape within and provides a surface for current transfer to neighboring tapes and for soldering of lead connections.

Figure 2:
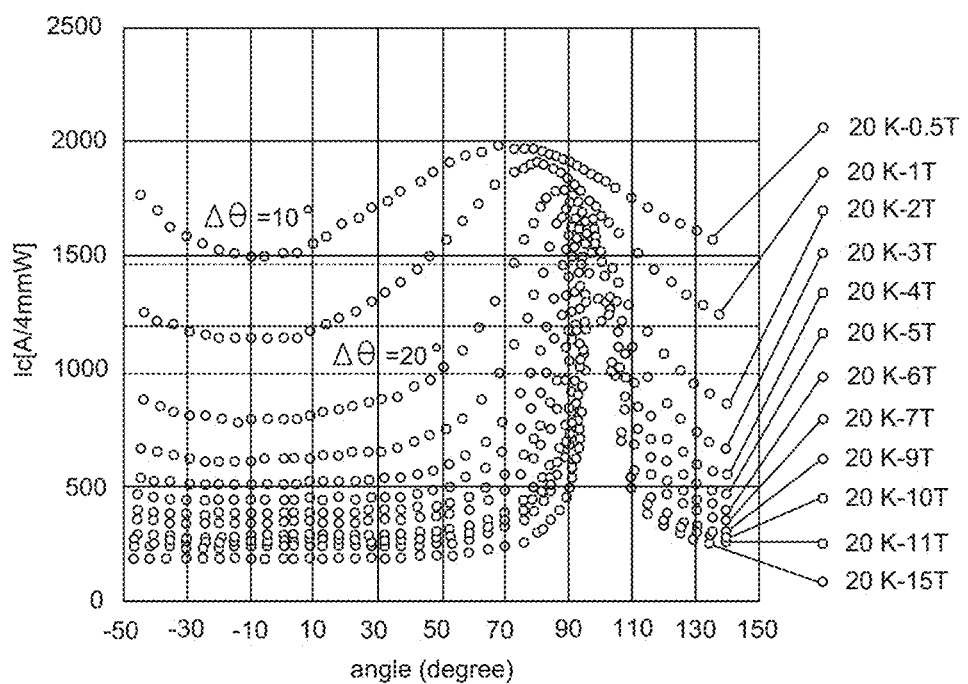
FIG. 2 is a graph showing dependence of critical current in a 4 mm HTS tape as a function of the angle between magnetic field and the tape face.

Second, the capacity for carrying superconducting current (the critical current $I_c$) is strongly anisotropic in HTS superconductors. Referring to FIG. 2, the maximum superconducting current that can be carried in the HTS layer (hereafter called $I_c$) is much larger when the tape is oriented when the c-axis of the HTS crystal lattice perpendicular to external magnetic field B (θ~90°) than when the tape is oriented with the c axis parallel to external magnetic field B (θ~0°).

Third, again referring to FIG. 2, the value of $I_c$ depends strongly on magnetic field B over the range 0-20 T, and on the temperature T over the range 4-77 K. There is thus a 'critical surface' $I_c(B, T, q)$ that strongly governs tape performance in a winding. HTS tape is extremely expensive: for example, a REBCO tape with $I_c$=200 A at self-field, 77 K costs~$80/m. Therefore the design of cable, coils, and magnet winding must optimize the use of HTS tape to achieve the most performance with the least quantity of superconducting tape.

The windings of high-field magnets typically require the use of a cable conductor, containing many HTS tapes that are bundled so that their faces are in touch contact with one another and the tapes can share the cable current $I_{cable}$. The contact resistance between tapes that are in face contact depends strongly upon the compression of the contacting copper-clad surfaces within the blocks in the assembled cable.

The above applications require six properties of the cable, structure, and windings employing HTS superconductor to operate with high cable current in high magnetic field with the potential for high heat loads:

A cable containing many tapes carrying current in parallel is required to provide sufficient ampere-turns to drive high magnetic field within practical limits of inductance. As a specific example, the toroid winding for a compact spherical tokamak capable of operating at 20 T magnetic field would require approximately 100 turns of cable with a cable current $I_{cable}$~40 kA. Each HTS tape within the cable has a capacity of ~200 A at 20 K when the c-axis of the HTS layers is perpendicular to the magnetic field, so the cable must contain a total of ~200 tapes. The cable structure must provide for transposition of the tapes within the cable: its orientation in the winding must twist continuously about the cable axis so that it is alternately on the inside then the outside of the cable orientation within the winding. The transposition of the tapes enforces a uniform distribution of current among the constituent tapes locally everywhere in the winding. If a superconducting cable of a winding were not transposed, then as the winding current was increased the current within each turn of cable would be pushed by the force of induction to concentrate in the tapes that were located toward the outside of the winding. Unequal current sharing would cause some tapes to quench from the superconducting phase at a lower current than would be the case if the current were uniformly distributed among the tapes in the cable. Achieving transposition in a cable of high-temperature superconducting tapes is challenging both because the flat tapes must be turned in their orientation with a twist pitch along the length of the cable, and because the superconducting performance is strongly anisotropic.

The energetics of quench in a high-current REBCO cable is significantly different from that of a cable containing wires of low-temperature superconductors NbTi and Nb$_3$Sn. Heat capacity increases as T$^3$ at cryogenic temperature, so the heat when a superconducting tape or cable quenches to normal-conducting state from superconducting state to normal state produces a much slower increase in temperature. In a high-field winding of REBCO cable, the risk of quench is most effectively dealt with by a passive quench stabilization strategy: provide adequate cooling to remove a significant amount of heat while limiting temperature increase, so that the winding current can be decreased so that the quench can recover. In a high-field winding of low-temperature superconductor cable, the risk of quench is most effectively dealt with by an active quench protection strategy: an external electrical network is used to heat domains in the winding to rapidly drive the entire winding into quench, so that the energy stored in the magnetic field is dissipated uniformly and cannot drive the local temperature in a quenching region high enough to damage it.

Figures 7A, 7B:
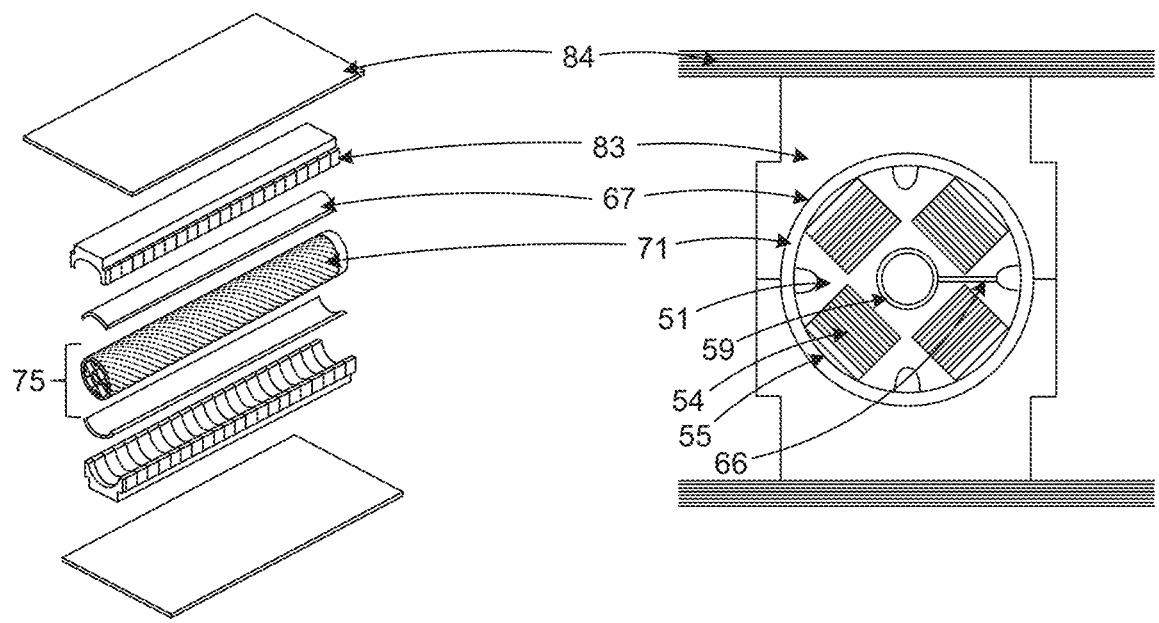
FIG. 7A is an exploded assembly of a BIC cable with MICA paper slip-surface co-wound armor clamshells and electrical insulation.
FIG. 7B is a front view of the BIC cable of FIG. 7A.
Figures 10A, 10B:
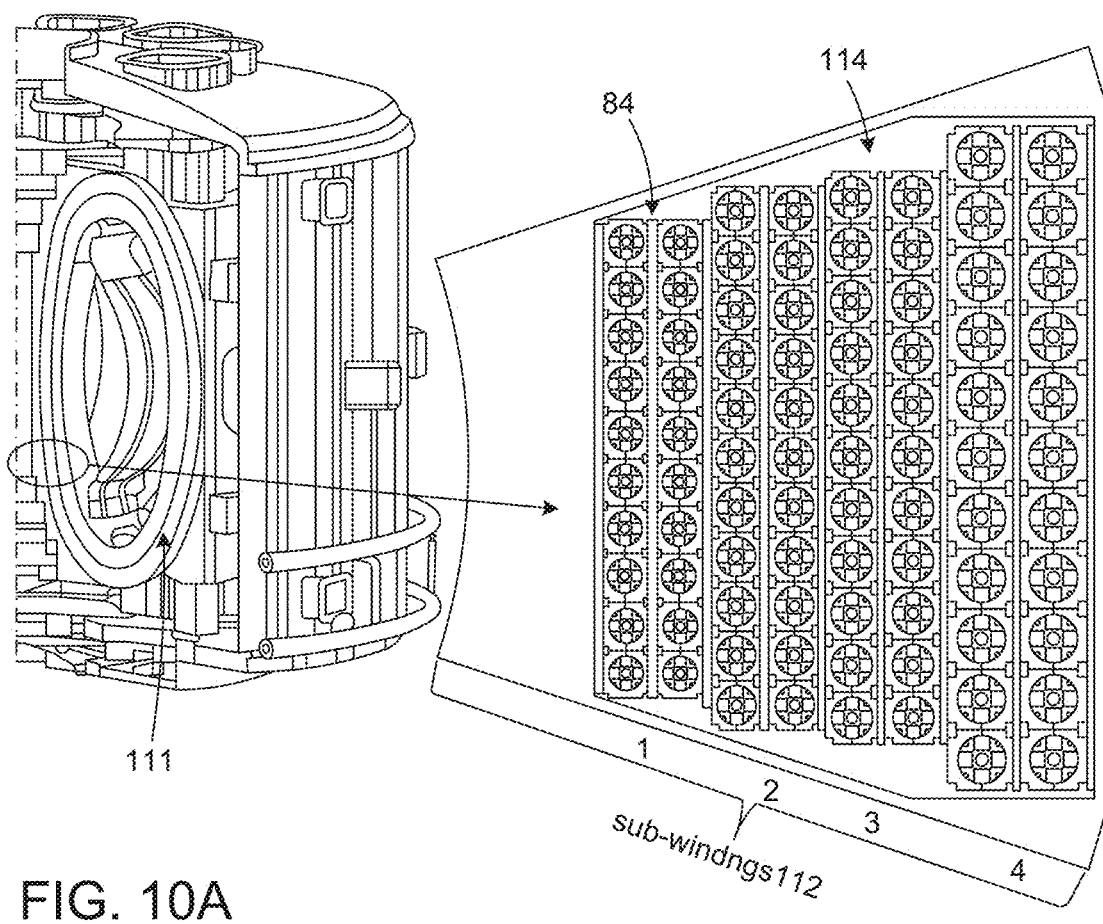
FIG. 10A is a partial sectioned-perspective view of a compact spherical tokamak.
FIG. 10B is a close-up view of a winding of armored BIC cable in one toroid winding segment.

In a high-field winding, the Lorentz stress accumulates from layer to layer within the winding and can accumulate to levels that exceed the mechanical strength of the superconducting tape, the stabilizing copper matrix, and the composite insulation layers 84 (see FIGS. 7A, 7B, 10B). As one example, recent designs for tokamaks for magnetic-confinement fusion would require a toroid magnet with maximum field ~20 Tesla, corresponding to Lorentz forces of >1 GPa in the windings. That stress level would risk damage to the superconducting tapes, the copper matrix containing them, and the composite insulation layers 84 within the windings. It is therefore necessary to integrate stress management within the winding and within the cable itself, with three objectives:

i. to bypass the accumulating transverse stress in the winding through an armor structure that is integrated with every turn of cable yet de-coupled from the cable itself so that the interior structure of the accumulating stress is not applied to the tapes, their copper matrix, and the internal structure that provides for transposition and current-sharing;

ii. to bypass hoop stress in each layer of the winding so that it is carried primarily in the armor and not in the cable itself;

iii. to provide shear release between the cable and its surrounding armor, and between succeeding layers of armor, so that the overall stress in the winding is passed through the succession of layers of armor to a high-strength superstructure and correspondingly the maximum stress within the cables is limited to safe levels throughout the winding.

Figure 4:
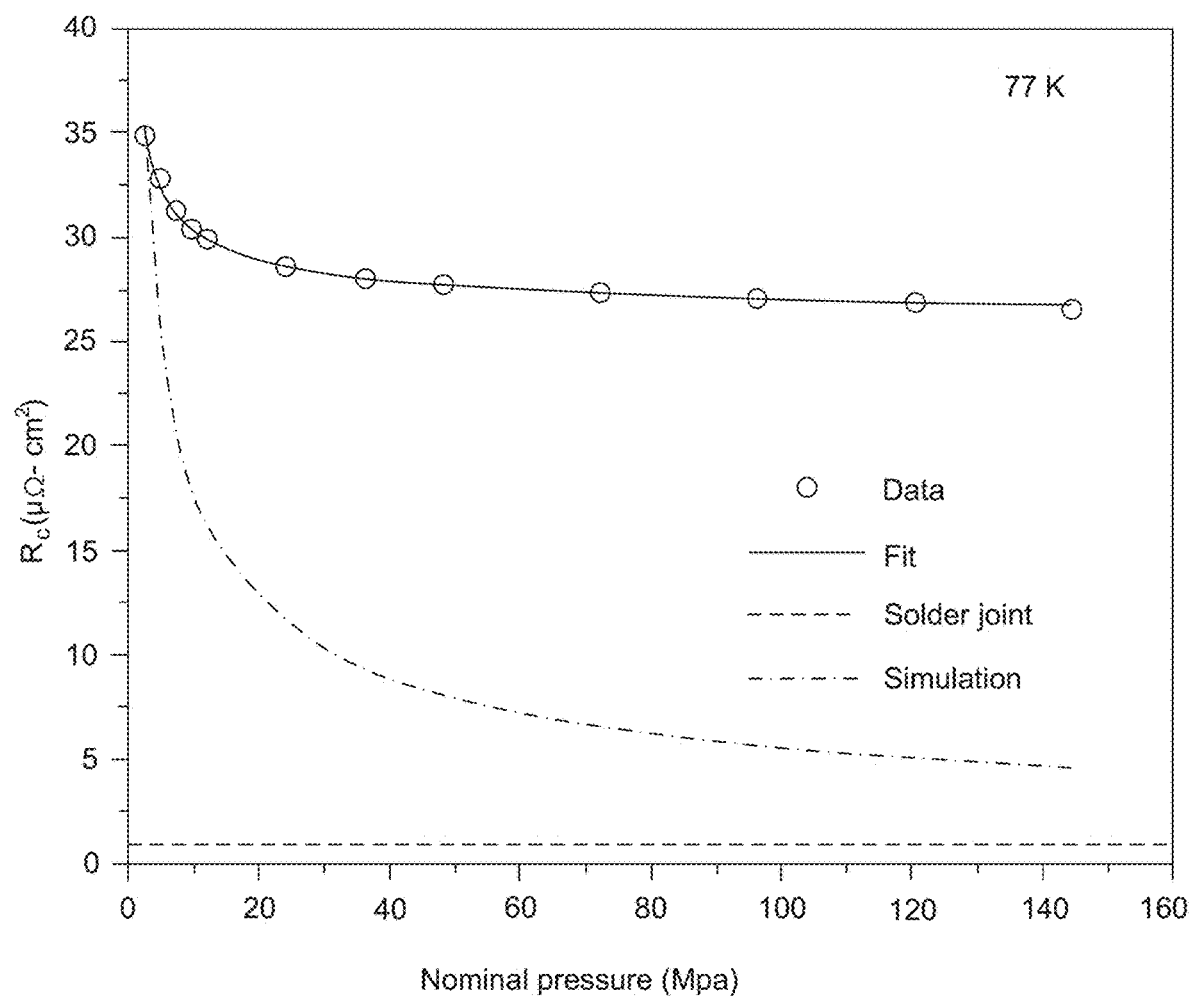
FIG. 4 is a graph showing contact resistance between the faces of copper-clad HTS tape as a function of compressive stress.

Control of AC losses within the cable requires current sharing among the superconducting tapes within the cable. The contact resistance between adjacent tapes in a block must be controlled to a value that is approximately optimum for balancing the pattern of induced currents among strands as the cable current is increased or decreased. The contact resistance of between the copper faces of neighboring tapes was measured and FIG. 4 illustrates the results. Optimum contact resistance for current-sharing to minimize AC losses would correspond to a compression of ~1 MPa between the tapes in each stack, which would require elastic compression within the cable structure. Such elastic compression is not provided in any prior art for cables.

The cooling and heat transfer within a large winding must be sufficiently well-connected with all cable turns in a winding so that heat can be removed in all operating and fault modes of the winding sufficient to maintain the winding at operating temperature. The windings required to produce high magnetic field in a large magnetic volume require a thick winding of many layers, which would be problematic to cool solely by series flow through the cables. A preferable method for heat transfer would be cross-flow cooling, in which supply and return coolant flow runs along conductive channels flanking each turn of the structured cable within the winding and coolant flows through transverse channels from supply to return throughout the winding. No provision for cross-flow cooling is made in any prior art for HTS cables or for windings comprising HTS cables.

The magnetic field within a winding of a high-field magnet typically decreases monotonically from a maximum value in the innermost layer of the winding (nearest the enclosed field volume) to a minimum value in the outermost layer (farthest from the enclosed field volume). The winding should be configured as a barrel-wound series connection of layers with graded conductor, in which the number $N_n$ of HTS tapes in the nth layer is inversely proportional to the critical current $I_c(B_n)$ corresponding to the magnetic field $B_n$ at that layer:

$$N_n = \frac{I_{cable}}{4I_c(B_n)} \qquad \text{Eq. (1)}$$

Operating temperature is a parameter that requires balance between the operation of the magnet for its intended application, the capital cost of the REBCO tapes (the lower T, the lesser is the cost), and the cryogen to be used for heat transfer. Liquid helium is typically not an option for cryogen unless the external heat loads are very low. Liquid hydrogen could support operation at ~20 K, but has significant safety complications that would require mitigation for many applications. Liquid neon could support operation at ~30 K, but it is extremely expensive (~50 times more expensive than liquid helium). Liquid nitrogen could support operation at ~77 K, but REBCO has much-diminished $I_c$ at 77 K, especially at high B, and nitrogen freezes solid at 63 K. So the only cryogen that is workable for heat transfer over the range of temperature of HTS is helium vapor.

Structured Cable

Referring to FIGS. 5A-5C and 7A-7B, a structured cable core 60 comprises a laminated core 51, four conductor blocks 54, four alignment rods 58, and a perforated round center tube 59. Laminated core 51 comprises a stack of metal core laminations 52 and 91, which are cut from metal foil, preferably copper, by either EDM or die-stamping, and stacked face-to-face. Core laminations 52 and 91 are fabricated with four rectangular channels 53 and four alignment channels 50 symmetrically disposed on its exterior and a round center hole. The core laminations are aligned by a set of alignment rods 58 that are inserted as a close fit in the alignment channels 50 of the laminar core 52. A perforated center tube 59 is inserted in the center hole in the laminated core 52.

Figure 5A:
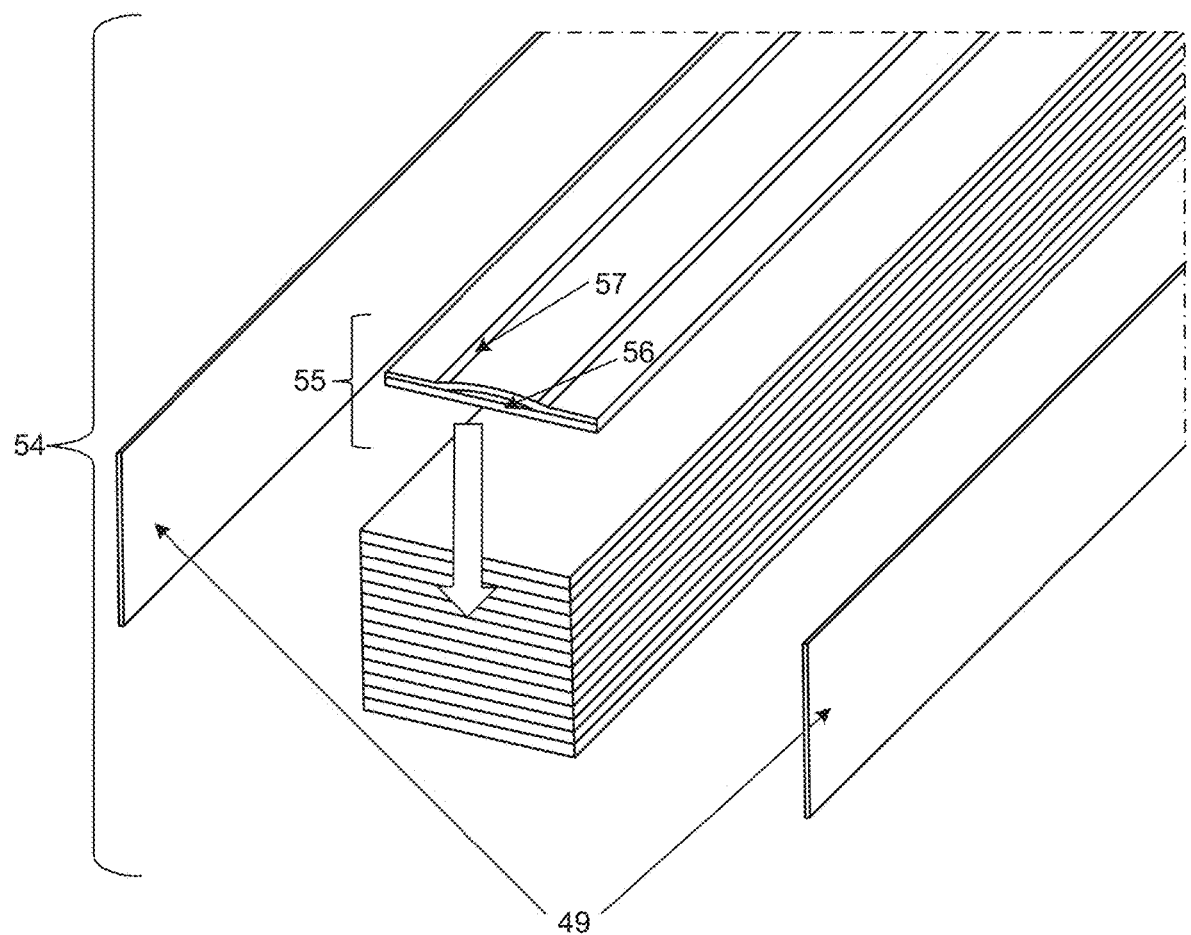
FIG. 5A is an assembly of tape stack, laminar spring, and fluxed solder strips forming a conductor block.
Figure 5B:
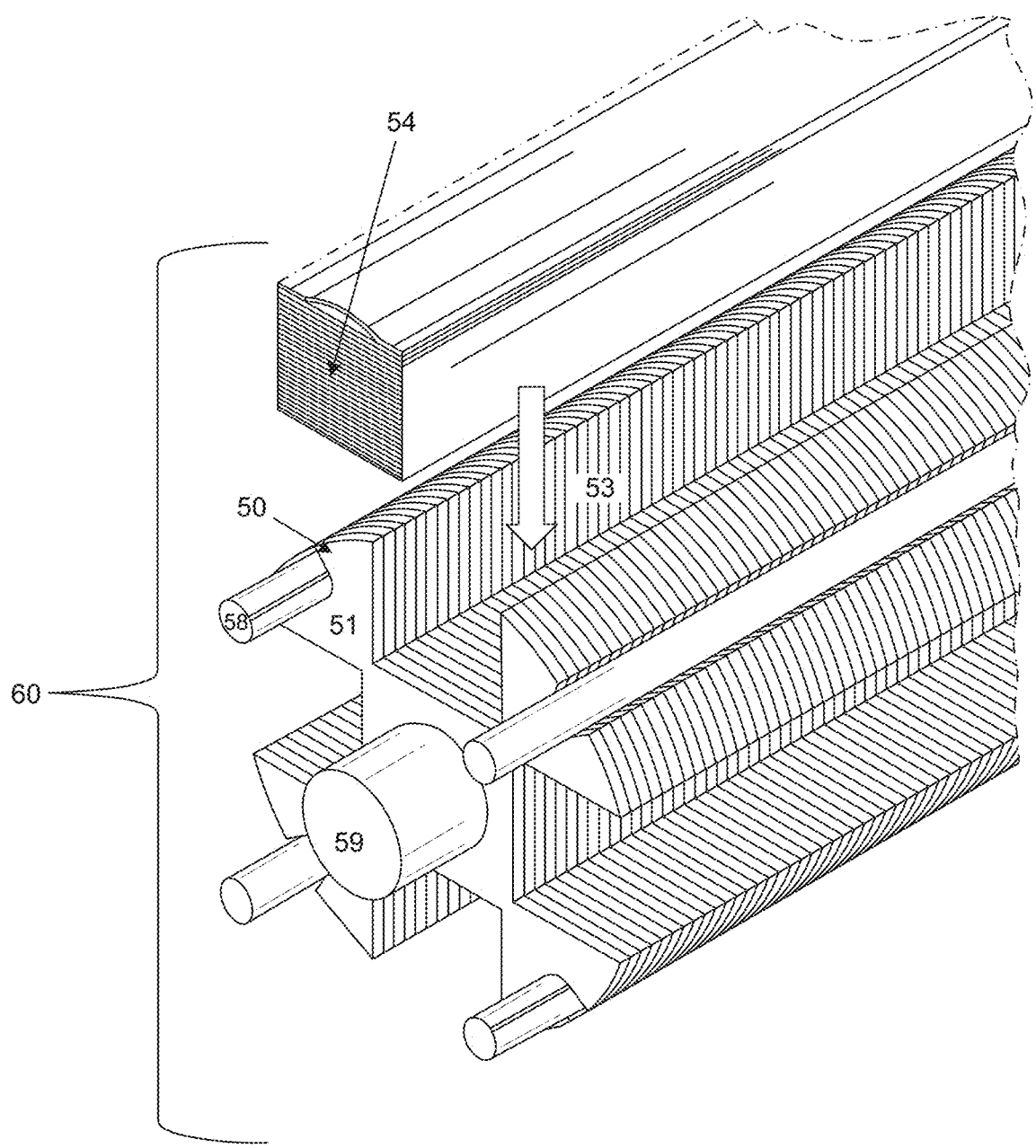
FIG. 5B is an exploded view of an assembly for stacked core laminations.
Figure 5C:
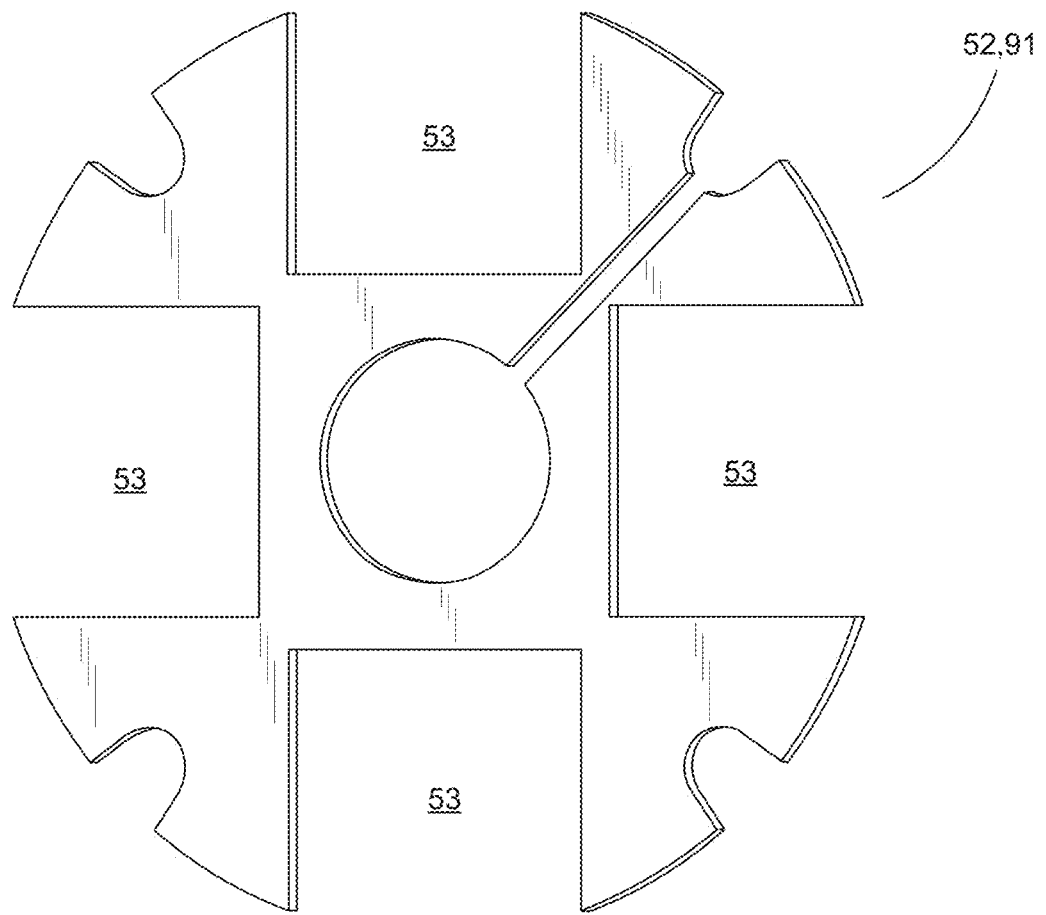
FIG. 5C illustrates a single core lamination.
Figure 6:
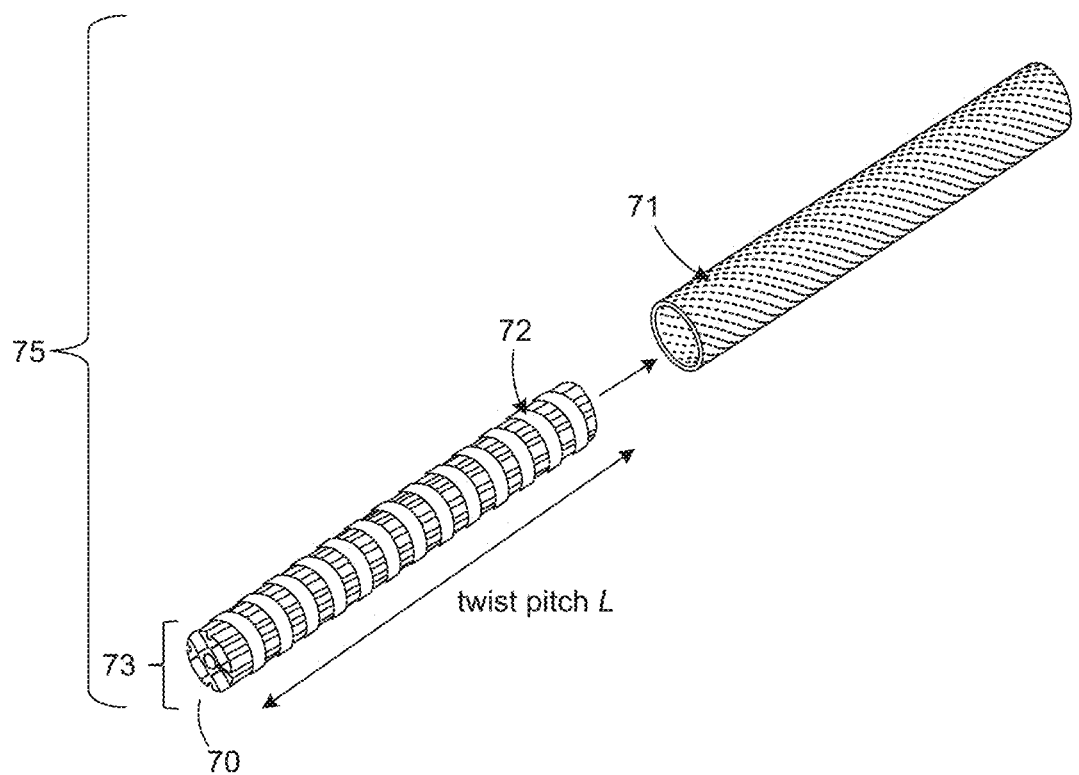
FIG. 6 is an exploded assembly of a structured cable core into a perforated sheath tube.

Referring to FIG. 5A, a conductor block 54 comprises a rectangular tape stack of a multiplicity of N HTS tapes stacked parallel and face-to-face, and two thin foil tapes 49 of flux-coated low-melt solder which are pressed into the side faces of the tape stack, and a laminar spring 55 located attached to the outer face of the tape stack. The components of the conductor block 54 are bonded under compression so its overall size is controlled to be a close fit for inserting into the rectangular channel 53. The laminar spring 55 comprises an assembly of a flat strip 56 of high-strength metal alloy and a contoured spring strip 57 of spring-tempered metal alloy. The strips 56 and 57 are welded along their common edges to form a laminar spring 55.

Referring to FIGS. 6, 7A-7B, and 8, a particular configuration is disclosed in which the structured cable core 60 is twisted about its axis with a twist pitch L to form a twisted cable core 70. The twisted cable core 70 provides for transposition of current distribution when the cable is configured in a multi-turn winding so that the Lorentz forces of the magnetic field produced by the current do not create a non-uniform distribution of current among the tapes within the cable. In cases where the cable us configured in a winding with a contour radius R extending over a bend angle q, the value of twist pitch L can be chosen so that the catenary length of all tapes in the twisted cable are equal over any given segment of the cable. This condition is satisfied for the choice $R_\theta = nL$ for some integer n.

A method of forming cable includes mounting a segment of structured cable core by a mandrel on a rotary headstock of a lathe or other means of rotary support and placed under axial tension by a rotary tailstock. An end of the segment of structured cable core is rotated sufficiently to produce the desired twist pitch L to form a twisted cable core 70. Clamps are then removed and a spiral overwrap tape of high-strength metal alloy is wound under tension onto the twisted cable core, with the opposite direction of wrapping to that of the twist pitch for transposition and the spiral overwrap tape is secured at the ends of the segment by affixing its ends to the outer surface of the laminar core 51, for example by spot welding. The twisted cable core is inserted as a loose fit into a perforated sheath tube 71, and the sheath tube is drawn down onto the twisted cable core so that it radially compresses the laminar springs 55, provides an elastic compression of the HTS tapes within each conductor block 54, and locks the twist pitch L under static friction between the outer surface of the spiral overwrap tape and the inner surface of the perforated sheath tube 71. The blocks-in-conduit (BIC) cable 75 is then ready for use in applications.

Co-Wound Armor

Referring to FIGS. 7A and 7B, a particular embodiment of co-wound armor comprises an assembly of the BIC cable 75 within two armor half-shells 83. The co-wound armor is configured so that the elements of cable and armor can be co-wound to conform to a desired curvature radius R of the winding. The assembly of armor half-shells 83 provides robust support of both hoop stress and transverse stress within the winding, and the armor half-shells bypass the transverse Lorentz stress produced by other layers of the winding so that they do not produce strain inside the BIC cables 75.

Figure 8:
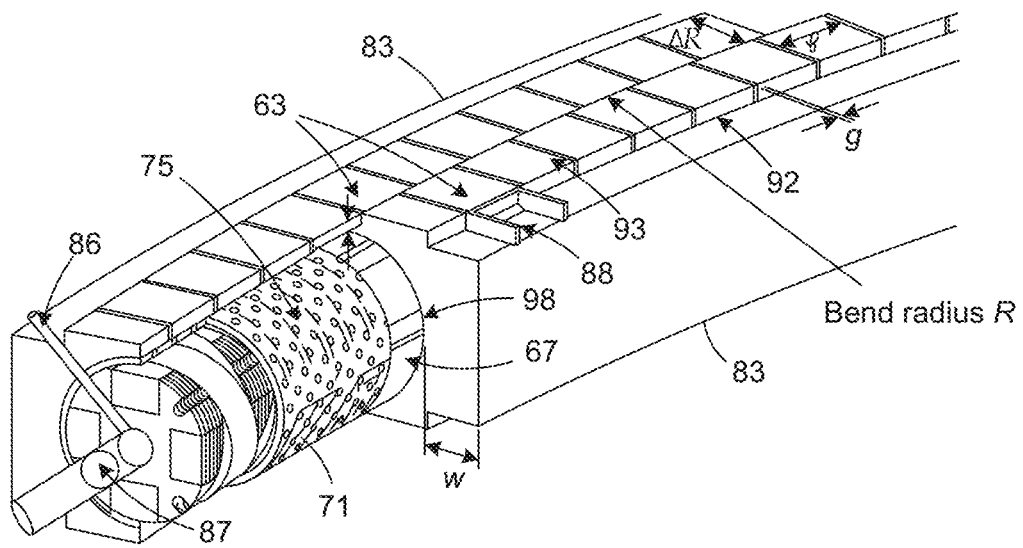
FIG. 8 is a detailed cutaway view of a segment of BIC cable an co-wound armor.

Referring to FIG. 8, each armor half-shell 83 comprises a straight channel of high-strength metal alloy, for example Haynes 620. Each armor half-shell 83 is machined to produce a half-cylindrical inner contour 98, two rectangular step channels 92, and a linear array of kerf-cuts 93. The cut width g and the spacing $\ell$ of the kerf-cuts 93 are chosen so that, when the structured cable 70 and armor half-shells 83 are co-wound onto a section of a winding with curvature radius R, the inner armor clamshell bends inward at the bottom of the kerf-cuts 93 so that the outer edge of adjacent kerf-cuts 93 nearly closes:

$$\frac{\Delta g}{\Delta R} \sim \frac{\ell}{R} \qquad \text{Eq. (2)}$$

The kerf-cuts 93 thereby relieve the bending strain that would otherwise be created if one were to bend a structural beam of overall thickness 2 $\Delta R$, so that each clamshell retains its full structural strength to support the bridging of radial stress within a multi-layer winding, and also the web portion of the clamshell (which is not kerf-cut) retains its full strength to support hoop stress in each layer of a multi-layer winding.

Still referring to FIG. 8, half-cylindrical sheets of mica paper 67 are inserted in an annular gap between the outer surface of the perforated sheath tube 71 and the inner clamshell surface 98 of the armor half-shells 83. The mica paper 67 provides a low-friction slip-surface between the BIC cable 75 and the inner cylindrical cavity 81 in the armor half-shells 83.

Cross-Flow Cooling

Referring to FIG. 8, a configuration of the co-wound armor is disclosed in which provision is made for cross-flow of coolant fluid throughout the entire length of BIC cable in a winding. Coolant flow is sustained by providing a supply manifold at one location on the winding. Pressure difference DP between the center tube and the rectangular step channels 92 at one location in the winding. The rectangular step channels 92 intersect the bottom of the kerf-cuts 93 to form outer coolant flow channels parallel to the cable axis that interconnect through the perforations in the perforated sheath tube 71 and along the alignment channels 50 (see FIG. 9B).

Figure 9A:
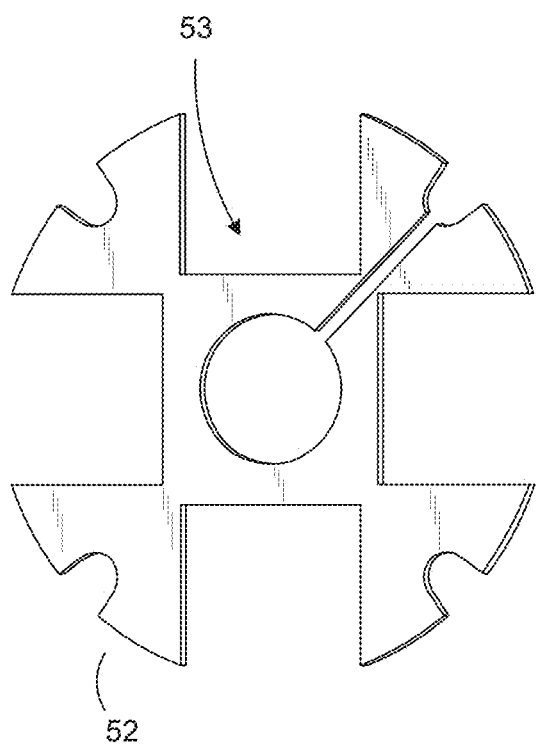
FIGS. 9A and 9B are front views of a standard core lamination and a cross-flow aperture lamination, respectively.
Figure 9B:
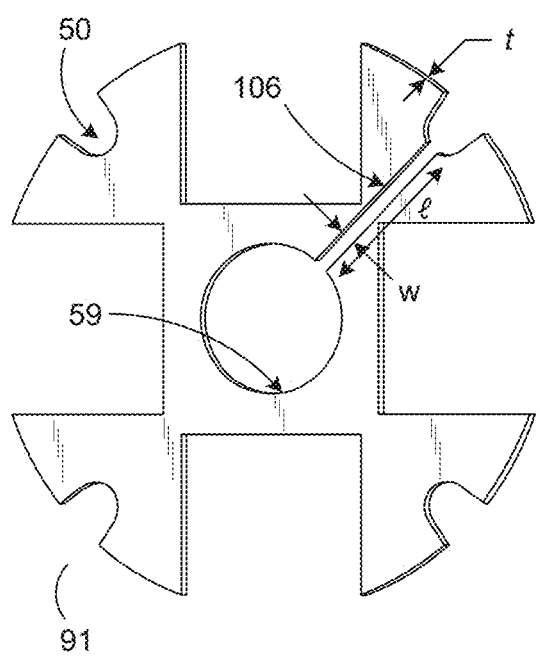

Referring to FIGS. 9A and 9B, the standard core laminations 52 seal face-to-face in the laminated core 51, and thereby prevent radial fluid flow between the perforated center tube and the alignment channels 50. In some aspects, a modified core lamination 91 is inserted in the stack of standard core laminations 52 at particular locations along the laminated core 51. The modified core lamination 91 contains a cross-flow aperture 106 which provides for a controlled radial flow of coolant 102 from the perforated center tube to an alignment channel 50. The flow resistance of each cross-flow aperture 66 is determined by the choice of the width g, thickness t, and radial length $\ell$ of the cross-flow aperture.

In some aspects for cross-flow cooling a supply flow of cold coolant is injected into the perforated center tube 59 at one location 86 (see FIG. 8) along each turn of an overall winding, and the warm return flow is extracted from one of the four rectangular step channels 92 on the outside corners of the co-wound armor at the far end of each turn. A flow blockage 87 is installed in the center tube at a location just up-stream of the location 86 to channel the supply coolant flow through that turn of the winding. A flow blockage 88 is installed in the rectangular step channels at a location just down-stream of the location 86 to channel the return coolant flow 104 from that turn of the winding. The choice of the flow resistance of the cross-flow apertures 66 and the spacing X of cross-flow apertures 66 (see FIG. 7B) along the laminated core can be chosen to balance the distributed flow resistance through the linear array of cross-flow apertures and the flow resistance along the perforated tube sheath 71 and the four rectangular step channels 92, so that the coolant provides ~uniform cross-flow cooling along the entirety of a multi-turn winding.

Electrical Insulation

The layers of a winding containing many turns of cable must be electrically insulated to accommodate the turn-turn voltage that is induced during charging and discharging of the current in the winding. Referring to FIGS. 10A and 10B, a method is disclosed in which the successive turns of BIC cable and armor clamshells are wound as a series connection of four sub-windings 112 each containing two layers of armored BIC cable, each layer is wound onto a composite insulation layer 84 that insulates it electrically from the preceding layer, and successive layers are connected in series either by continuing the wind to the next layer or by connecting the last turn of one layer to the first turn of the next layer end of another BIC cable using a splice connection, hereafter called barrel-winding.

In some aspects of barrel-winding, the composite insulation layer 84 comprises a laminar assembly of mica paper, fabric composed of high-melt-temperature glass (for example, S-2 glass), and a slurry of low-melt-temperature glass (for example a mixture of lead-containing glass frit powder and a liquid that will volatilize at a temperature lower than the melt temperature of the frit powder).

Successive turns of BIC cable 75 and armor clamshells are co-wound onto the composite insulation layer 84 over the turns of the last layer. The composite insulation layer 84 thereby provides robust electrical insulation layer-to-layer within the toroidal winding, and provides a low-friction slip-surface between layers so that the accumulation of Lorentz stress passes is conveyed through the layers of co-wound armor without shear stress throughout the winding.

In some aspects of barrel-winding, the successive turns within each layer are not electrically insulated from one turn to the next. Instead the outer half of the co-wound armor on each turn is bonded to the outer half of the co-wound armor on the previous turn by locally welding a region along their common edge at one bond location or at a multiplicity of bond locations. The succeeding turns are thereby anchored in their contour within the winding (so that they cannot spring-back), and succeeding turns are electrically connected at the bond points so that induced voltage between turns will drive a current through the contact resistance of the armor at each contacting point. The bonded regions are limited to a modest fraction of the circumference along the seam between successive turns, and the high-strength alloy of the co-wound armor has significant electrical resistance at the operating temperature $T_0$, so only a small amount of heat is dissipated by inductively driven current between turns during charging and discharging.

Figure 11:
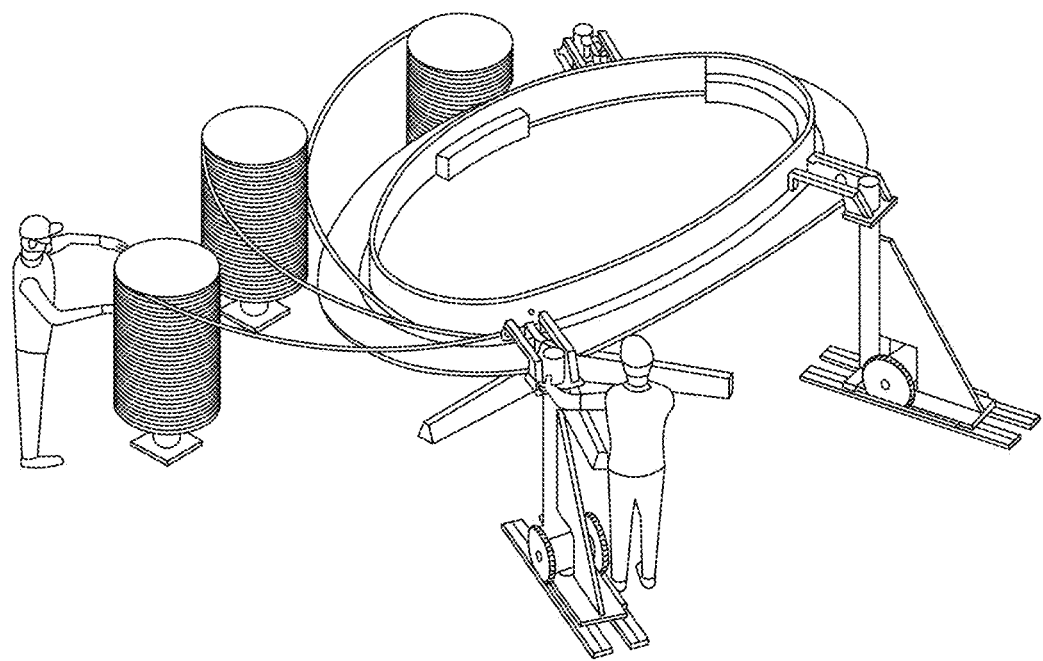
FIG. 11 is a method and apparatus for co-winding BIC cable and armor clamshells.

Referring to FIG. 11, a method for co-winding a structured cable with an assembly of armor half-shells 83 to form each layer of a layer-wound winding to provide stress management within a magnet winding and the ability to co-wind the bending radius R required for the winding while preserving the registration and mechanical properties of the structured cable inside. The co-wound armor consists of two identical armor half-shells 83, fabricated from a high-strength alloy. Each armor beam has a rectangular outer contour, an open half-cylindrical channel is either machined or extruded into the center of one long face, and rectangular step channels are machined or extruded along each corner opposite to the face with the half-cylindrical channel. The diameter of the half-cylindrical channel is made equal to the diameter of the structured cable, plus a radial allowance to accommodate a wrap of shear-release mica paper separating the structured cable from the co-wound armor for the purpose of releasing shear stress.

Graded Winding Configuration

Figure 3:
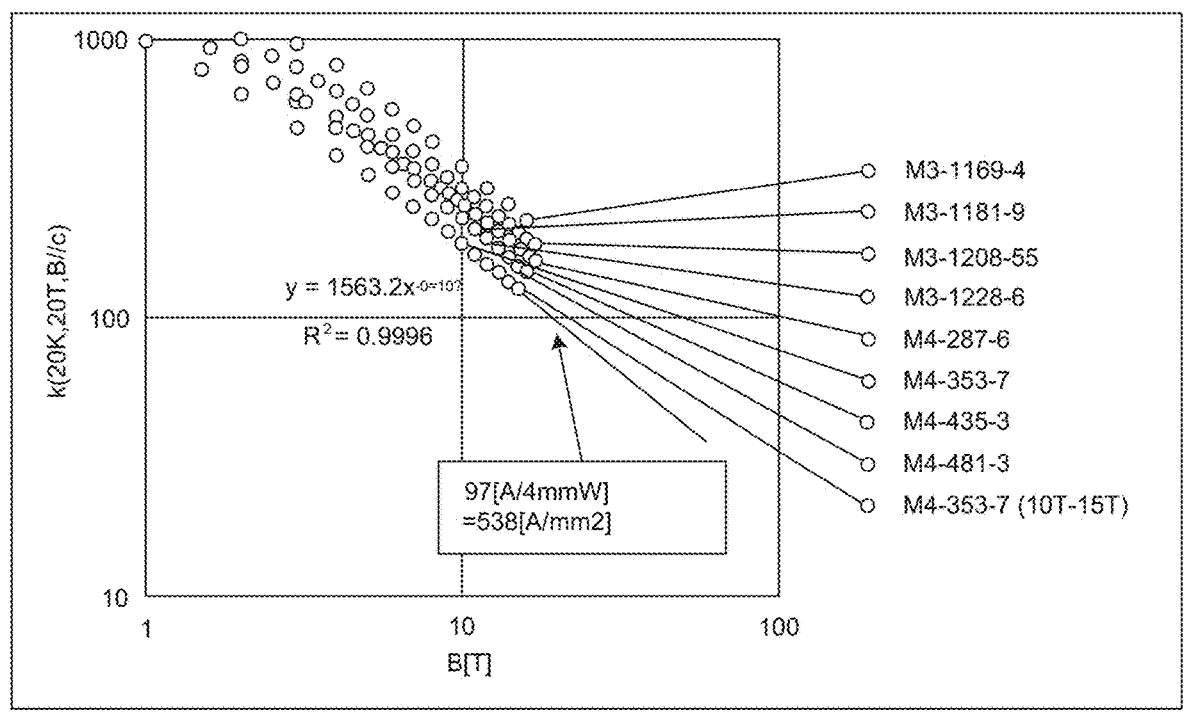
FIG. 3 is a graph showing critical current at 20K in samples of 4 mm wide HTS tape as a function of perpendicular magnetic field.

Referring to FIG. 3, the maximum superconducting current $I_c$ that can be carried by an HTS tape depends strongly upon the magnetic field strength that is ambient in that tape. In most superconducting applications the magnetic field strength increases monotonically from the outermost layer of a winding to the innermost layer of a winding. In most applications all turns of a winding are connected in series and so carry the same cable current $I_{cable}$. Correspondingly the number $N_n$ of tapes that is required in layer n is:

$$N_n = \frac{I_{cable}}{4I_c(B_n)} \qquad \text{Eq. (3)}$$

Referring to FIGS. 10A and 10B, a winding configuration is disclosed in which a winding is arranged as a series-connected barrel-winding with graded cable composition, in which each sub-winding n consists of one or more layers of cable turns containing a particular number of tapes $N_n$. The sub-windings are connected in series by splice joints. The winding is configured with each sub-winding wound onto the previous sub-winding, so that the magnetic field strength at the innermost sub-winding 1 is greatest and the magnetic field strength in the succeeding sub-windings 2,3,4 are progressively less.

As one example of the benefit of the structured cable, co-wound armor, and graded conductor in an application, referring to FIGS. 10A and 10B, a set of toroidal windings 111 was designed for a toroid suitable for the requirements of a spherical tokamak. The toroid comprises a set of 10 toroidal windings 111, symmetrically disposed around a common axis. Each toroid winding 111 has inner radius $R_1$=30 cm, plasma radius $R_0$=1.2 m, maximum field in the winding $B_{max}$=20 T, and operating temperature T0=20 K. The configuration of each toroid winding 111 is a barrel-winding 112 of armored BIC cable, with graded cable composition, comprising 4 sub-windings of 2 layers each. Each sub-winding comprises a winding of armored BIC cable. Layers are separated by a composite insulation layer 84. The structured cable in layer n comprises four conductor blocks 54, and each conductor block 54 contains $N_n$ HTS tapes of width 6 mm. The cable current is chosen to be 43 kA in order to provide a roughly optimum magnetic design. The critical current $I_c(B_{max}, T_0)$ in the HTS tapes of each layer is assumed to be the performance specified in FIG. 3.

TABLE 1

Maximum magnetic field strength Bn, the number Nn of tapes per conductor block 54, and the number Tn of turns per layer in the nth layer of the toroidal winding 111

| B(T) at layer | 5.6 | 7.7 | 10.4 | 12.6 | 14.6 | 16.2 | 17.8 | 19.8 |
|---|---|---|---|---|---|---|---|---|
| #tapes/block | 31 | 31 | 47 | 47 | 58 | 58 | 69 | 69 |
| #turns/layer | 10 | 10 | 11 | 11 | 11 | 11 | 11 | 11 |

The method of barrel-winding with graded composition may be compared with the method traditionally used to fabricate toroid windings for tokamaks, in which an armored cable is wound as a pancake winding, in which succeeding turns are wound onto the preceding turn. In a pancake winding all turns must have the same composition and so the number of HTS tapes in each turn is:

$$4N = \frac{I_0}{I_c(B_{max})} = 69 \qquad \text{Eq. (4)}$$

Figure 12:
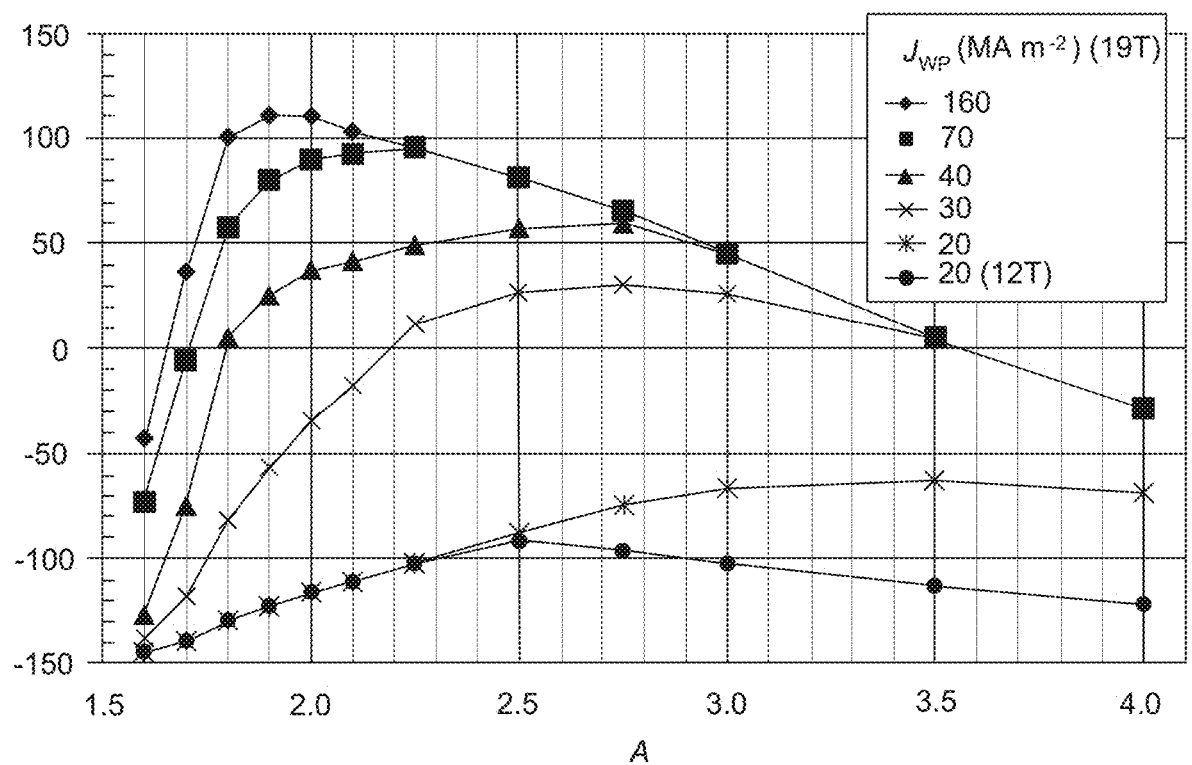
FIG. 12 is a graph showing net electric power of a compact spherical tokamak as a function of aspect ratio A and winding pack current density $J_{WP}$.

Menard taught that the performance of a tokamak to produce net electric power from thermonuclear fusion is strongly determined by the aspect ratio ($A=R_0/R_{min}$) and the winding current density $J_{WP}$ of the toroid windings. Referring to FIG. 12, the values of $J_{WP}$=80 A/mm² and A=2.0 for winding 111 provide favorable performance for net electric power.

Stress Management in Co-Wound Armor

Lorentz stress is a severely limiting consideration in high-field superconducting windings for applications such as hadron collider dipoles and tokamaks for magnetic-confinement fusion. Stress accumulates through the successive layers of a winding, and creates forces, torques, and shears within the winding. Additionally, the magnetic fields of other windings, for example the poloidal windings of a tokamak, produce asymmetric patterns of forces and torques within the main toroidal winding. In applications for hadron collider dipoles a bore field of ~20 T is desired. In applications for fusion tokamaks a maximum field of ~20 T and an operating temperature of ~20 K are desired. Lorentz stress in a 20 T winding typically accumulates to a maximum >1 GPa within the windings. But the structured cable in each turn of a winding cannot support stresses greater than ~200 MPa.

Referring to FIG. 8 in the example winding 111 for a 20 T toroid, three levels of support are provided:

$$S_n = \frac{I_0 B_n}{2\Delta R} < 35 MPa$$

the BIC cable 75, on which is exerted only the Lorentz stress produced on that cable by the magnetic field;

the co-wound armor 83, which bypasses the transverse stress and hoop stress throughout the winding. The bridge thickness bn in each layer of the co-wound armor half-shells 83 is sized to limit the concentration of transverse stress as Lorentz stress is bypassed around the structured cable: $I_0 B_n < E_0$. The web thickness w of the armor half-shells 83 for each layer is sized to limit the concentration of transverse stress as Lorentz stress is bypassed around the structured cable:

$$\frac{(B_0^2 - B_n^2)}{2\mu_0} \frac{\Delta R}{w_n} < E_0.$$

The superstructure that supports the overall toroidal geometry of the winding is designed to limit stress to the same limit as in the co-wound armor.

A finite-difference model of stress and strain was developed for the 20 T winding 111. The von Mises stress in the BIC cables 75 and co-wound armor 83 validated that stress is de-coupled at the interface between each turn structured cable and its co-wound armor so that the stress within the structured cable does not exceed ~200 MPa under any condition. The von-Mises stress in the superstructure of high-strength alloy, in which the bulk of superstructure is hidden in the view to provide cross section maps of the stress in the interior of the superstructure beams, validated that the stress does not exceed working strength of high-strength alloy at any location. Both distributions validate the estimates for peak stress in the elements of the winding and the choices of armor dimensions to limit stress concentration.

Interleaved Splice Joints

All sub-windings of the toroid must be connected in series. A technology for demountable interleaved splice joints and leads is presented and is used for this purpose. The electrical resistance of each joint must be low enough that the resistive heat does not present a dominant heat load to the cryogenic system that maintains the operating temperature of the windings.

Figure 13:
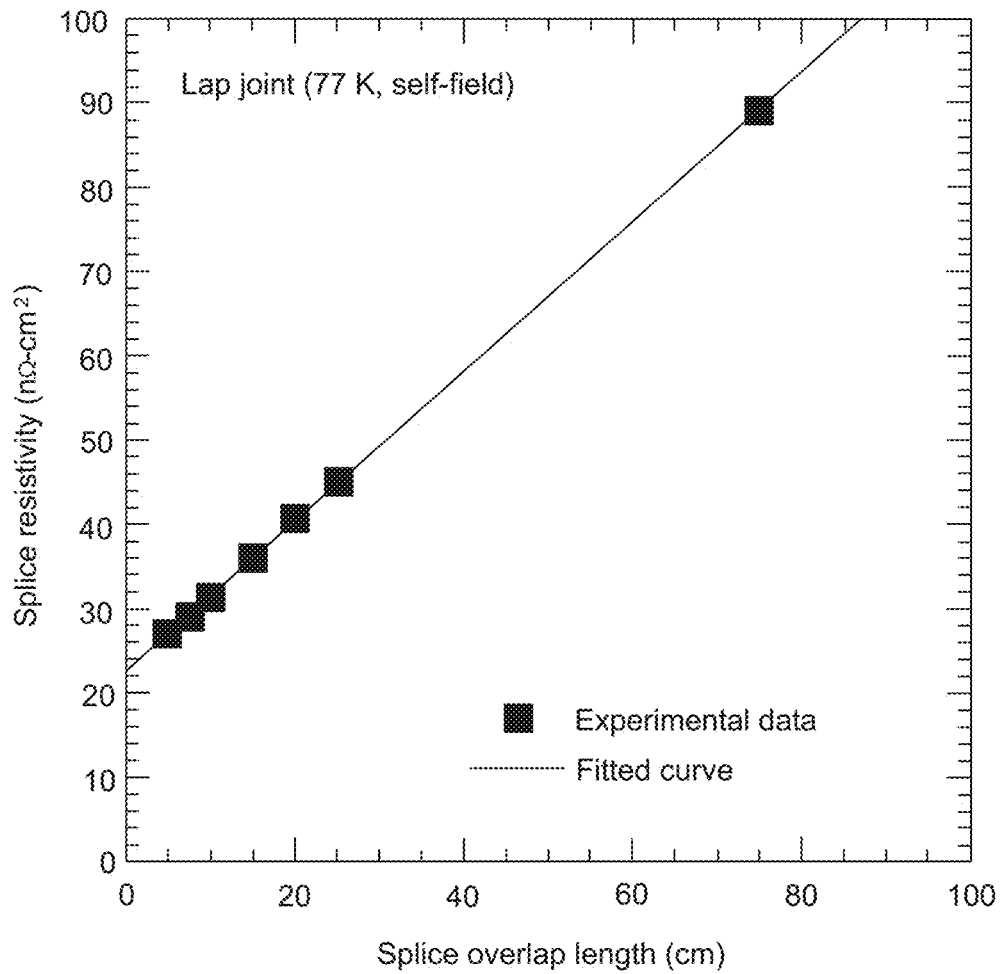
FIG. 13 is a graph illustrating splice resistivity vs splice overlap length.

Referring to FIG. 13, a lap joint of two HTS tapes in which an overlap length $L_s$ of the ends of both tapes are tinned over a length using a low-melt solder, for example indium based solder (In 98%-Ag 2%) and then assembled so that the tinned length of the two ends overlap face-to-face. The lap joint is compressed and heated to flow the solder. The measured joint resistance is:

$$R_J = \frac{\rho \ell}{A} \quad \text{Eq. (5)}$$

where $\rho \ell$ is the product $R_J A$, measured to be 23 n$\Omega$cm$^2$, and A is the face area of the lap joint. For a tape width 4 mm and an overlap length $L_s$=10 cm, the joint resistance between two HTS tapes is $R_J$=100 n$\Omega$.

Figure 16:
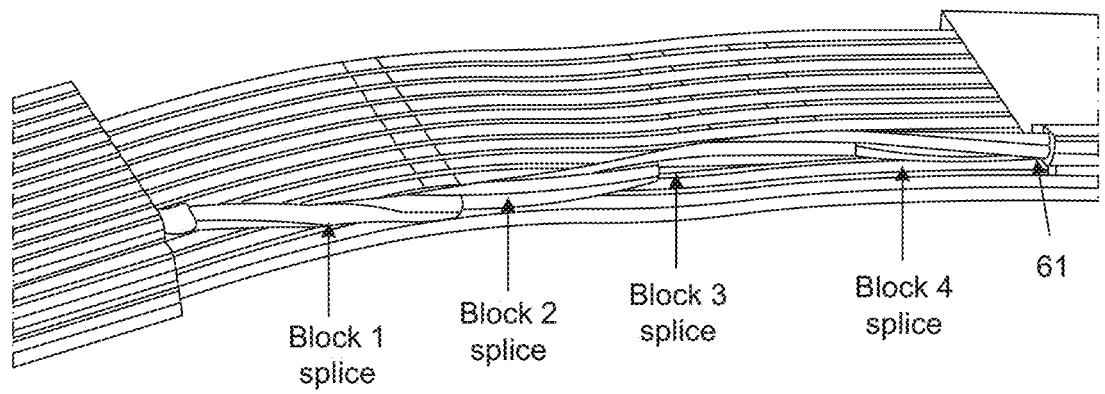
FIG. 16 illustrates a linear sequence of interleaved splices on the four conductor blocks of a twisted structured cable for connecting two layers of a winding.

Referring to FIGS. 14A-14C, a method is disclosed for interleave splicing of the ends of two BIC cable segments 160, in which each in turn of the four conductor blocks 54 in the end segment of one structured cable is spliced with the corresponding conductor block 54 in the end segment of another BIC cable segment 75 (see FIG. 8). Referring to FIG. 14B, the end of each BIC cable segment 75 is prepared by trimming back a length~6 $L_s$ of the perforated sheath tube 71 (see FIG. 6) from the ends of each twisted cable segment that is to be spliced. HTS tapes of the four conductor blocks 54 are trimmed to the lengths shown in FIG. 16 so that the tape ends from successive conductor blocks are spaced by a separation~1.5 $L_s$ from the end of the cable segment. Starting with one conductor block from each of the cable ends that are to be spliced, the HTS tapes within each conductor block are tinned with a layer of low-melt solder and the respective tinned tape ends 153 of the two conductor blocks are interleaved, one from each block, much as one would shuffle a deck of cards. The interleaved splice then comprises a splice block 144 of thickness roughly twice the thickness of the conductor block from each structured cable. FIG. 14C illustrates the spliced cable.

The next pair of conductor blocks is spliced at a location that is spaced by a separation equal to one-fourth of the twist pitch L, and the splice procedure is repeated until all four pairs of conductor blocks are spliced in this way at four locations that are spaced a distance~L apart.

Referring to FIGS. 14A-14C, the splices of each cable are made at locations in the winding where one side face of the co-wound armor is accessible to either the outside face or a side face of the winding. For the example of a layer-layer splice, the splice is located where the last turn of a cable in an inner layer is to be bent outward on an S-bend to align with the first turn of structured cable in the next layer. The co-wound armor of one of the BIC segments to be spliced is cut away 152 on the side on which the conductor blocks are spliced so that there is open access to construct the spliced blocks. The laminated core of one of the structured cable ends 153 is cut back so that the laminated core 51 of the other structured cable end 154 provides the center support for the four conductor blocks through the region that is to be spliced. A cover bracket 155 is built to conform to the cut boundaries of the co-wound armor, with side aperture sufficient to accommodate the thicker side dimension of the spliced blocks. Cover bracket 155 contains an array of four cover laminar springs and four cartridge heaters that are located in alignment with each of the spliced blocks. Once all four spliced blocks have been formed, the cover bracket is installed onto the splice region so that the cover laminar springs elastically compresses each spliced block. The cartridge heaters are energized to heat the spliced blocks 144 sufficiently to flow the solder and form a lap splice among all HTS tapes in the spliced block. The splice blocks can then be inspected, and if they are satisfactory cover bracket 155 is welded to the co-wound armor segments to restore high-strength connection for stress management of both transverse and hoop stress in the region of the interleaved splice.

The performance of the interleaved splice may be estimated from the parallel resistance of a splice of the HTS tapes in one conductor block of the 20 T toroid winding 111. Referring to Table 1, each conductor block on the outermost layer contains N=31 tapes, and all structured cables carry the cable current $I_{cable}$=43 kA. The heat produced in one spliced block is $Q_s$=4N$R_s$=0.1 W. If each of the ten toroidal windings of the toroid contained one splice joint per layer, as for example 161, the total number of spliced blocks would be 4·8=32, and the total resistive joint heat per toroidal winding would be $Q_D$=32$Q_D$=0.3 W.

Figure 15:
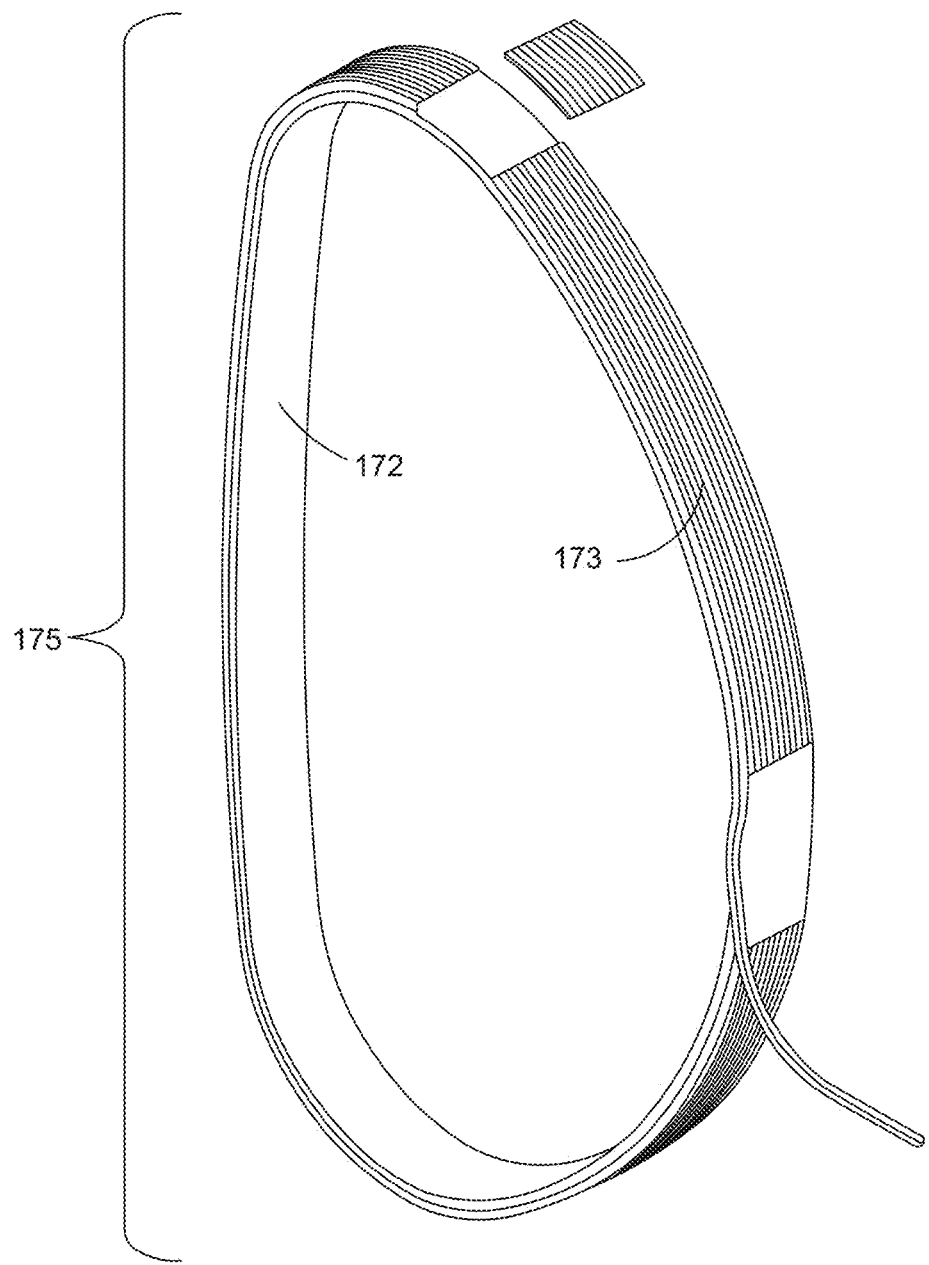
FIG. 15 illustrates splicing all turns of a winding of armored BIC cable.

Referring to FIG. 15, in another embodiment of toroidal windings for a tokamak, each toroidal winding could be constructed as a two-segment demountable winding 175, comprising two demountable segments 172 and 173, joined by demountable splice joints, so that each toroidal winding could be assembled onto an intact plasma vessel. The provision of demountable joints would make it possible to assemble and disassemble the toroidal windings separately from the plasma vessel, which could convey several interesting benefits for tokamak design and operation.

Referring to FIGS. 10A and 10B, each two-segment toroidal winding for the 20 T toroid 111 would require a total number of splices 2·4·86=70 W. The interleaved splice technology therefore makes it possible to construct two-segment toroidal windings in which the resistive heat would be a small part of the total heat budget for the tokamak Current Sharing Among Conductor Blocks The properties of AC losses and quench dynamics in high-current superconducting cables for high-stored-energy windings are governed by current-sharing among the conductor blocks 54 within the structured cable. A simplified model is used to calculate the dynamics of current-sharing in an overcurrent event when the current I in one local region of one conductor block in a BIC cable 75 within a winding is greater than the aggregate critical current of its constituent HTS tapes. The overcurrent event could originate from local heating of the conductor block, or from damage to one or more tapes within the conductor block, or from a change in the angular orientation of the tapes in the ambient magnetic field as the blocks transpose along a twist pitch, or from redistribution of current within the cable that is driven by induction during charging or quench. Whatever the origin, the dynamical response will typically include redistribution of current from one conductor block to the two neighboring conductor blocks 54 within the BIC cable 75. In an actual situation within a winding the pattern of current sharing evolves in the spatial distribution of current along each turn of BIC cable 75 as a function of time, it is complex to model in detail, and the details depend strongly upon the operating conditions.

Figure 17:
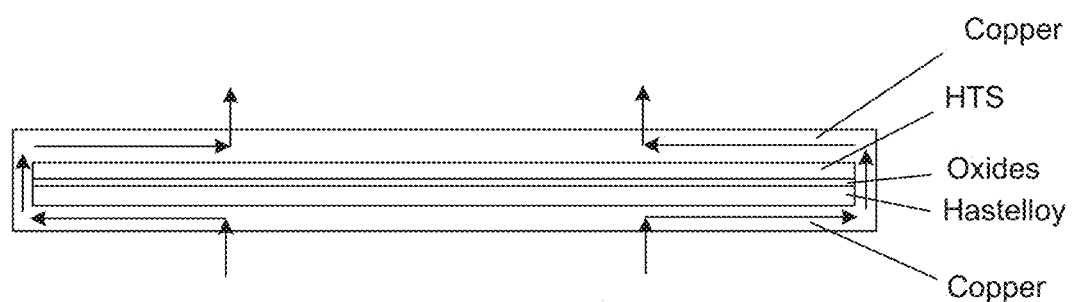
FIG. 17 illustrates current flow from one face of a one HTS tape to the next in a conductor block.

Referring to FIG. 17, a simplified model was analyzed to evaluate the total heat that would be generated if the winding 111 were operating at its full cable current $I_{cable}$=43 kA corresponding to a maximum field of 20 T, and its current were to be forced to fully transpose from one conductor block to its neighbors over a region of one twist pitch. Specifically the model assumes that the entire cable current is inserted into just one of the four conductor blocks of the BIC cable 75 at a particular location s=0 along its length, and then the same current $I_{cable}$ is extracted symmetrically from its two neighbor conductor blocks at a location s=L=0.63 m one twist pitch away. In the simplified model this situation was analyzed assuming steady-state conditions, assuming that the temperatures of the center tube and the sheath tube are held at $T_0$=20K by flow of a coolant fluid. In order to simulate the effect of transposition, it was assumed that the magnetic field at the cable had magnitude 20 T but rotated in its angular orientation through 360° over the pitch length. The field direction dependence was therefore introduced as a scaling factor f(θ) that is obtained from the data of FIG. 2:

$$I_c(B,\theta) = I_{c\perp}(B) f(\theta) \quad \text{Eq. (6)}$$

where θ is the angle between the normal to the wide face of the tape and the external magnetic field $\vec{B}_0$ and $I_c$(20 T, 0°)=180 A. Thus the angles between $\vec{B}_0(s)$ and the face planes of the horizontally stacked tapes h and the vertically stacked tapes are defined as:

$$\theta_h(z) = \frac{2\pi z}{L_{pitch}} + \pi/2 \quad \text{Eq. (7)}$$

$$\theta_v(z) = \frac{2\pi z}{L_{pitch}} \quad \text{Eq. (8)}$$

Figure 19:
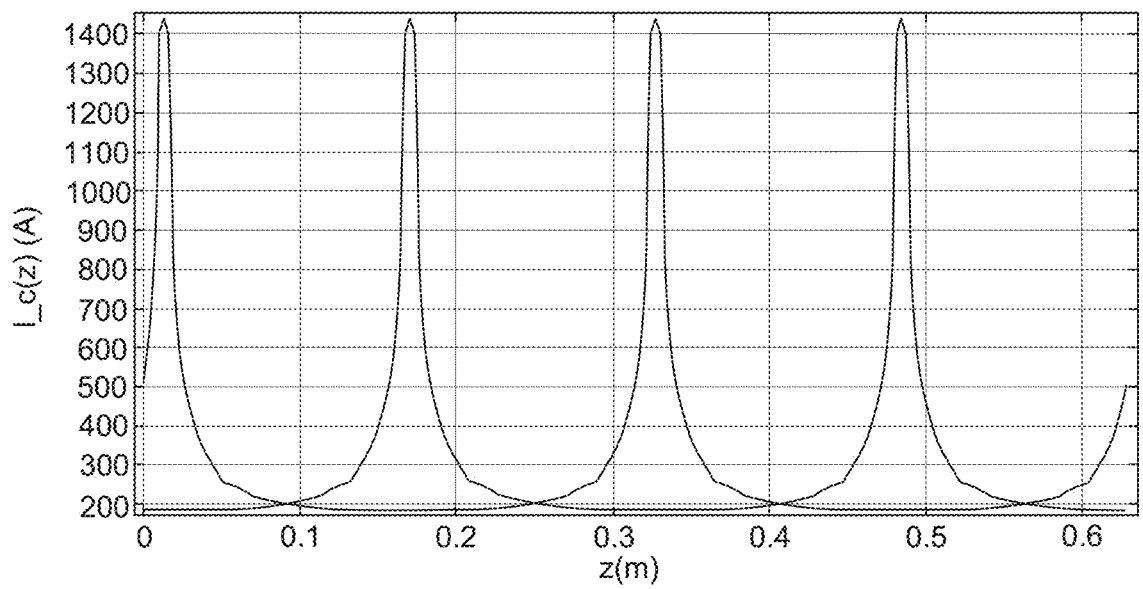
FIG. 19 is a graph showing $I_c$ in horizontally and vertically stacked tapes along 1 pitch length of cable.

Referring to FIG. 19, the critical current $I_c$(20 T, θ) in one HTS tape is shown as the orientation of the tape transposes along one full twist. The simplified model thus simulates the redistribution of current in a bounding case of current disruption and the resistive heat Q that is produced. From this bounding case, and the heat capacity CV of the cold mass of the interior of a segment of BIC cable 75 of length L, the time constant τ=Q/CV for dynamical response can be estimated. This time constant is of significance for all phenomena related to AC losses, charging, and quench in the windings.

Specifically, each HTS tape parallel to its plane (the x-z plane in the local coordinate system of the tape), has effective resistivity defined as:

$$\rho \parallel eff\left(E_{\frac{x}{z}}, T, \theta, B\right) = \left[\frac{h_{Cu}}{\rho_{Cu}(T,B)} + \frac{1}{R_{HTS}\left(E_{\frac{x}{z}}, B, \theta, T\right)}\right]^{-1} (h_H + 2h_{Cu}) \quad \text{Eq. (9)}$$

The resistance per unit length of an HTS tape is defined using:

$$\frac{E_{x/z}}{E_c} = \left[\frac{1}{I_C(B,\theta,T)}\right]^n \quad \text{Eq. (10)}$$

Where I is a transport in the HTS layer:

$$R_{HTS}\left(E_{\frac{x}{z}}, B, \theta, T\right) = w\left[\frac{E_c}{I_C(B,\theta,T)}\right]^{1/n}\left[\frac{E_{x,y}}{I_C(B,\theta,T)}\right]^{1-1/n} \quad \text{Eq. (11)}$$

where $$E_C = 1\frac{\mu V}{cm}$$

is the quench threshold condition defined for $I_c$, and w=6 mm is the width of the tape, $h_{Cu}$=15 μm is the thickness of the copper layer, and $h_H$=30 μm is the thickness of the Hastelloy® layer, and n=24 is the n-value for the superconducting-normal transition for the EBCO layer in the HTS tape.

Figure 18:
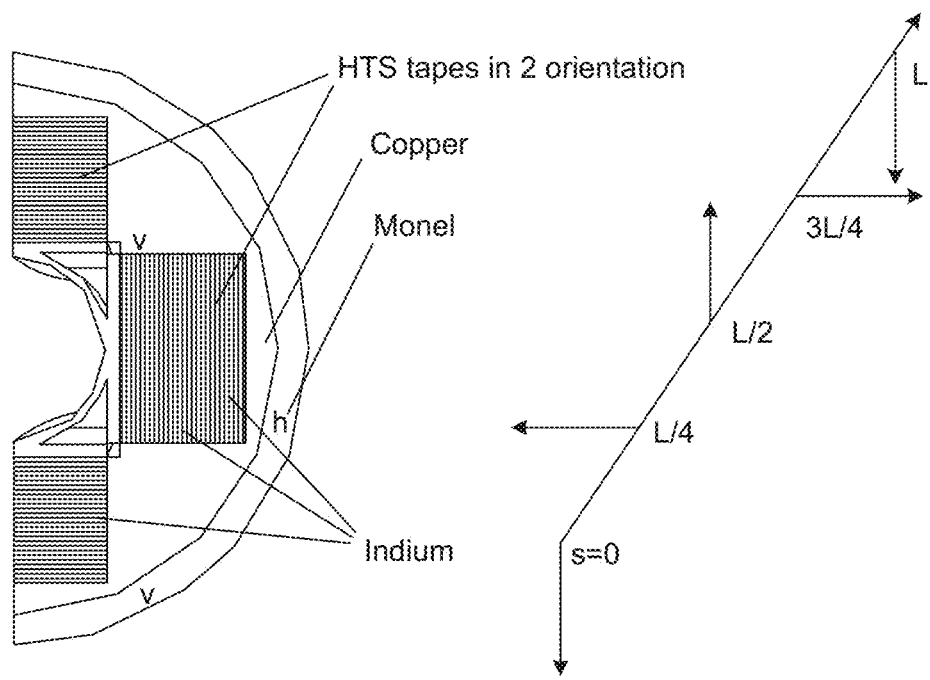
FIG. 18 is a cross-section of a structured cable.

In the third direction (perpendicular component or y-direction in the local coordinate system of the tape) due to the presence of a thin oxide layer (buffer layers), and ignoring current flow through the more resistive Hastelloy® layer, one can use the simplified model for current flow shown in FIG. 18. This yields an effective resistivity:

$$\rho \parallel eff(T,B) = \frac{\rho_{Cu}(T,B)\frac{w^2}{h_{Cu}} + R_C}{h_H + 2h_{Cu}} \quad \text{Eq. (12)}$$

where w is the width of the tape and $R_c$ is the contact resistance between stacked tapes. The pressure dependence of the contact resistance has been experimentally measured and is presented in FIG. 4.

The HTS tapes within each conductor block 54 assumed to be compressed by a constant pressure of 1 MPa (maintained by the elastic compression of the laminar spring 55), corresponding to a value $R_c$=4 nΩ·m².

The same approach is used to calculate the thermal conductivity of homogenized HTS tape (but ignoring the negligible HTS presence):

$$k \parallel eff(T,\theta,B) = \frac{h_H k_H(T) + k_{Cu}(T) 2 h_{Cu}}{(h_H + 2h_{Cu})} \quad \text{Eq. (13)}$$

$$k \perp eff(T,B) = \left[\frac{h_H}{k_H(T)} + \frac{2h_{Cu}}{k_{Cu}(T,B)}\right]^{-1}(h_H + 2h_{Cu}) \quad \text{Eq. (14)}$$

FIG. 18 shows a half cross section (xy-plane) of the model. Each block contains 53 HTS tapes. As a first approximation the model consists of the tapes, the copper wedges that comprise the laminated core, a layer of low-melt solder with thickness $h_f$=25 μm connecting the edges of each HTS tape to the adjoining copper wedge and the perforated sheath tube.

Referring to FIG. 19, the steady-state boundary condition of the simplified model requires that each of the 53 HTS tapes in the top conductor block v (top green block) is fed an injected current of 720 A (4 times the critical current), corresponding to the cable current $I_{cable}$=43 kA, at the injection location of the cable (s=0);

the cable current $I_{cable}$ is extracted from the location s=L;
all four conductor blocks are equipotential at s=L.

In essence, this simplified model could be interpreted as representing a cable with damaged or broken tapes at location s=0 in three segments. The steady-state solution for the distribution of current, and temperature, and for the aggregate heat from to the boundary tubes, is calculated using finite-difference methods in the computer code COMSOL-Multiphysics.

The distribution of current density J was analyzed in cross-section slices at several locations along the BIC cable within a winding. It was evident that current was approximately equally distributed among the conductor blocks at the middle segment, as would be expected from the boundary condition. Streamlines of current are displayed to follow how current continuously redistributes among all blocks along the segment of the BIC cable 75.

The distribution of resistive heat deposition was analayze in cross-section slices along at locations along the cable. Most of the heat deposition occurs in the first Δs~0.1 m after injection. The total resistive heat load deposited in the segment of BIC cable was 6.9 W.

The dynamical response of an armored BIC winding to a local perturbation in the performance of the HTS tapes within its BIC cable 75 is characterized by the localization scale Δs on which current redistributes in response to the perturbation. Excellent current transfer among the conductor blocks is afforded the low contact resistance $R_c$ that is afforded by pressure-loaded face contact among the HTS tapes in each block and the low resistance for current transfer between blocks through the solder bond of the edges of all tapes to the adjoining copper wedge of the laminated core 51. Excellent heat transfer within the winding is afforded by the cross-flow cooling, so that the boundaries at the center tube and the sheath tube are maintained as approximate isotherms even when local heat is dissipated. The resulting localization of current redistribution provides a basis for quench stability and minimum AC losses even in the large high-field windings required for fusion devices and particle accelerators.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A sub-cable comprising a multiplicity of copper-clad superconducting tapes comprising superconductor Rare-Earth Barium Copper Oxide (REBCO) tapes stacked face-face such that the faces are in contact, further comprising a laminar spring contacting the outermost face of the sub-cable, the laminar spring comprising two strips of high-strength spring-tempered metal alloy that form an arched spring and are welded to one another along their common edges to provide a compliant spring action over a range of compression.

2. A structured cable comprising a plurality of sub-cables of claim 1.

3. The structured cable of claim 2, wherein a first sub-cable and a second sub-cable of the plurality of sub-cables comprise an interleaved spliced joint that joins the first and second sub-cables together.

4. The structured cable of claim 3, wherein the interleaved spliced joint is electrically insulated between layers by a radiation-hard composite insulation layer.

5. A lamination-stack core for carrying electric current, the structured cable comprising
   a plurality of copper laminations is fabricated with channels on the outside to accommodate a multiplicity of sub-cables;
   features on the perimeter to facilitate orientation of all laminations so that the channels are aligned to accommodate insertion of a sub-cable;
   a center hole to provide a flow path for cryogen cooling; and
   insertion of a spring-loaded sub-cable into each of the channels such that the laminar spring is partially compressed when the cable is subsequently inserted into a cylindrical sheath and compressed.

6. The lamination-stack core of claim 5, wherein the plurality of core laminations includes at least one core lamination comprising a cross-flow aperture that allows for a radial flow of coolant.

7. A blocks-in-conduit (BIC) cable, comprising a lamination-stack core that is twisted about its axis with a twist pitch length L wherein the cable is inserted as a loose fit inside a perforated sheath tube of high-strength metal alloy, and further wherein the perforated sheath tube is drawn down onto the twisted cable such that the sheath tube compresses the laminar springs and locks the configuration of a plurality of laminations and tape conductors within the cable.

8. The high-strength alloy metal tube of claim 7, wherein the tube has a square outside cross-section and round concentric center hole wherein, the center hole has closely the same diameter as the outer diameter of the drawn perforated sheath; and open channels cut into corners of the tube to provide channels for flow of cryogen cooling.

9. The blocks-in-conduit cable of claim 7, wherein the plurality of sub-cables extend through the perforated metal sheath tube.

10. The blocks-in-conduit cable of claim 7, further comprising a perforated center tube that extends through a central aperture of each core lamination of the plurality of core laminations.

11. The blocks-in-conduit cable of claim 7, wherein an orientation of the stack of HTS tapes twist continuously about a central axis of the structured cable so that the stack of HTS tapes alternate between an inside and an outside of the structured cable along a length of the structured cable.

12. The blocks-in-conduit cable of claim 11, further comprising armor surrounding the plurality of core laminations and configured to reduce stress in the four conductor blocks of superconductor.

13. The blocks-in-conduit cable of claim 12, wherein the armor comprises first and second armor clamshells.

14. The blocks-in-conduit cable of claim 7, wherein the plurality of core laminations includes at least one core lamination comprising a cross-flow aperture that allows for a radial flow of coolant.

15. The blocks-in-conduit cable of claim 14, further comprising at least one transverse channel in the structured cable to provide cooling to the structured cable.

16. The BIC cable of claim 7, wherein four conductor blocks of superconductor extend through the perforated metal sheath tube.

17. An armored BIC winding comprising:
an armor clamshell with its half-round interior facing outwards;
a BIC cable; and
a second armor clamshell with half-round interior facing inwards, wherein the armored BIC is wound onto a mandrel.

18. The armored BIC winding of claim 17 in which successive turns of the cable are locally welded at small regions where they touch at least one azimuthal location on the winding, to provide a capstan locking of the helical structure while it is held under winding tension.

19. A method of making a co-wound armored cable for handling large mechanical stress and high magnetic field, the method comprising winding two armor clamshells and a BIC cable to form the co-wound armored cable,
wherein each armor clamshell comprises an open half-cylindrical channel; and
wherein a diameter of each half-cylindrical channel is equal to a diameter of the structured cable plus a radial allowance to accommodate a wrap of shear-release mica paper separating the structured cable from the two armor clamshells for the purpose of releasing shear stress.

* * * * *